US012070948B2

(12) United States Patent
Mine et al.

(10) Patent No.: US 12,070,948 B2
(45) Date of Patent: Aug. 27, 2024

(54) HEAD CHIP, LIQUID JET HEAD, LIQUID JET RECORDING DEVICE, AND METHOD OF MANUFACTURING HEAD CHIP

(71) Applicant: SII Printek Inc., Chiba (JP)

(72) Inventors: Tooru Mine, Chiba (JP); Suguru Munakata, Chiba (JP)

(73) Assignee: SII PRINTEK INC., Chiba (JP)

( * ) Notice: Subject to any disclaimer, the term of this patent is extended or adjusted under 35 U.S.C. 154(b) by 184 days.

(21) Appl. No.: 17/965,579

(22) Filed: Oct. 13, 2022

(65) Prior Publication Data

US 2023/0120427 A1 Apr. 20, 2023

(30) Foreign Application Priority Data

Oct. 14, 2021 (JP) ................................ 2021-168613

(51) Int. Cl.
*B41J 2/14* (2006.01)

(52) U.S. Cl.
CPC .................................. *B41J 2/1433* (2013.01)

(58) Field of Classification Search
CPC .................................................... B41J 2/1433
See application file for complete search history.

(56) References Cited

U.S. PATENT DOCUMENTS

2008/0018679 A1 1/2008 Kojima
2018/0086062 A1 3/2018 Irokawa
2019/0061350 A1 2/2019 Irokawa

FOREIGN PATENT DOCUMENTS

CN 114590030 A * 6/2022 .......... B41J 2/14201
JP 2016-107418 A 6/2016
JP 2019-42979 A 3/2019

OTHER PUBLICATIONS

Extended European Search Report in Europe Application No. 22200770.0, dated Feb. 21, 2023, 36 pages.

* cited by examiner

*Primary Examiner* — Justin Seo
(74) *Attorney, Agent, or Firm* — Crowell & Moring LLP

(57) ABSTRACT

A head chip, a liquid jet head, a liquid jet recording device, and a method of manufacturing a head chip each capable of ensuring the tolerance of the displacement between nozzle holes and communication holes while ensuring the bonding area between an actuator plate and an intermediate plate are provided. The head chip according to an aspect of the present disclosure includes an actuator plate, a nozzle plate disposed so as to be opposed to the actuator plate, and an intermediate plate disposed between the actuator plate and the nozzle plate. The communication holes each include a groove part having a lower-side opening part opening toward the nozzle hole, and a penetrating part having an upper-side opening part opening toward an ejection channel. A dimension in the X direction in the upper-side opening part is larger than a dimension in the X direction in the upper-side opening part, and a dimension in the X direction in the upper-side opening part is no larger than a dimension in the X direction of the channel opening part opening on a channel opening surface of the ejection channel.

11 Claims, 20 Drawing Sheets

HEAD CHIP, LIQUID JET HEAD, LIQUID JET RECORDING DEVICE, AND METHOD OF MANUFACTURING HEAD CHIP

RELATED APPLICATIONS

This application claims priority to Japanese Patent Application No. 2021-168613, filed on Oct. 14, 2021, the entire content of which is incorporated herein by reference.

BACKGROUND OF THE INVENTION

1. Field of the Invention

The present disclosure relates to a head chip, a liquid jet head, a liquid jet recording device, and a method of manufacturing a head chip.

2. Description of the Related Art

A head chip to be installed in an inkjet printer is provided with an actuator plate having a plurality of channels, and a nozzle plate bonded to the actuator plate. The nozzle plate is provided with a plurality of nozzle holes respectively communicated with the plurality of channels.

In the head chip, by changing volumes of the channels to thereby eject ink in the channels through the nozzle holes.

In recent years, due to miniaturization of the channels and a decrease in pitch of the channels, the tolerance of a displacement between the actuator plate (the channels) and the nozzle plate (the nozzle holes) has decreased. For example, when a bonding position of the nozzle plate with respect to the actuator plate is shifted in an arrangement direction of the channels, there is a possibility of leading to a deterioration of ejection characteristics and a leakage of the ink.

In JP-A-2019-42979, there is disclosed a configuration in which an intermediate plate is disposed between the actuator plate and the nozzle plate. The intermediate plate is provided with communication holes communicated with both of the channels and the nozzle holes. The communication holes are formed to be larger than the channels and the nozzle holes in the arrangement direction of the channels. According to this configuration, it is conceivable that it is possible to increase the tolerance of the displacement between the channels and the nozzle holes by making the channels and the nozzle holes communicate with each other through the communication holes compared to when making the channels and the nozzle holes directly communicate with each other.

When adopting the intermediate plate, it is conceivable to adopt a method (a first method) in which the communication holes are provided to the intermediate plate, and then the intermediate plate is bonded to the actuator plate, and a method (a second method) in which the intermediate plate is bonded to the actuator plate, and then the communication holes are formed.

When the first method is adopted, a high accuracy is required in the alignment between the communication holes and the channels when bonding the intermediate plate to the actuator plate. When making the communication holes large in order to decrease the accuracy required, it is difficult to ensure the bonding area between the intermediate plate and the actuator plate. The decrease in bonding area becomes a factor of causing a detachment of the intermediate plate, a leakage of the ink, and so on.

When the second method is adopted, it is necessary to penetrate portions of the intermediate plate overlapping the channels with larger dimensions than those of the channels. Therefore, there is a possibility that the bonding surface of the actuator plate to the intermediate plate is also processed when penetrating the intermediate plate to form the communication holes. When the bonding surface is processed, there occurs a factor of causing the detachment of the intermediate plate, the leakage of the ink, and so on.

The present disclosure provides a head chip, a liquid jet head, a liquid jet recording device, and a method of manufacturing a head chip each capable of ensuring the tolerance of the displacement between the nozzle holes and the communication holes while ensuring the bonding area between the actuator plate and the intermediate plate.

SUMMARY OF THE INVENTION

In view of the problems described above, the present disclosure adopts the following aspects.

(1) A head chip according to an aspect of the present disclosure includes an actuator plate in which a plurality of jet channels extending in a first direction is arranged in a second direction crossing the first direction, a jet hole plate which has a plurality of jet holes configured to jet liquid, and which is disposed so as to be opposed to a channel opening surface on which the jet channels open in the actuator plate, and an intermediate plate which has communication holes configured to respectively communicate the jet channels and the jet holes with each other, and which is disposed between the actuator plate and the jet hole plate, wherein the communication holes each include a groove part which has a first opening part opening toward the jet hole, and which is recessed toward a direction getting away from the jet hole plate, and a penetrating part which has a second opening part opening toward the jet channel, and which is communicated with the groove part in an area including at least the groove part to thereby penetrate the intermediate plate, a dimension in the second direction in the first opening part is larger than a dimension in the second direction in the second opening part, and a dimension in the second direction in the second opening part is no larger than a dimension in the second direction of a channel opening part opening on the channel opening surface in the jet channel.

According to the present aspect, since the dimension in the second direction in the second opening part is no larger than the dimension in the second direction of the channel opening part, it is easy to ensure the bonding area of the intermediate plate to the actuator plate. As a result, it is possible to ensure the bonding strength between the intermediate plate and the actuator plate to prevent the detachment of the intermediate plate and the leakage or the like of the liquid through an area between the intermediate plate and the actuator plate.

Further, even when forming the penetrating parts as post-processing after bonding the intermediate plate and the actuator plate to each other, it is possible to prevent the damage from being inflicted on the actuator plate when processing the penetrating parts.

Moreover, since the dimension in the second direction in the first opening part is larger than the dimension in the second direction in the second opening part, it is easy to perform the alignment between the groove part and the jet hole when bonding the intermediate plate and the jet hole plate to each other compared to when directly communicate the jet holes and the jet channels with each other. In other words, it is possible to allow the displacement between the groove part and the jet hole within the dimension in the second direction in the groove part. As a result, it is possible to achieve the miniaturization of the jet channels and the reduction in pitch of the jet channels while ensuring the positioning accuracy between the jet holes and the jet channels.

As a result, it is possible to ensure the tolerance of the displacement between the jet hole and the communication hole to achieve the miniaturization of the jet channels and the reduction in pitch of the jet channels while ensuring the bonding area between the actuator plate and the intermediate plate to enhance the durability of the head chip.

(2) In the head chip according to the aspect (1) described above, it is preferable that defining a direction crossing the second direction when viewed from a thickness direction of the intermediate plate as a third direction, a dimension in the third direction in the penetrating part is smaller than a dimension in the third direction in the channel opening part.

According to the present aspect, since the dimension in the third direction in the penetrating part is shorter than the dimension in the third direction of the channel opening part, even when forming the penetrating part as the post processing after bonding the intermediate plate and the actuator plate to each other, it is possible to prevent the damage from being inflicted on the channel opening surface of the actuator plate when processing the penetrating part.

Further, since the formation area of the penetrating part can be made small, it is possible to shorten the processing time of the communication holes. As a result, it is possible to increase the manufacturing efficiency of the head chip.

(3) In the head chip according to one of the aspects (1) and (2) described above, it is preferable that the channel opening surface faces to a thickness direction of the actuator plate, and the penetrating part protrudes toward both sides in the first direction with respect to the groove part.

According to the present aspect, since the dimension in the first direction in the groove part becomes smaller than that of the penetrating part, it is possible to shorten the processing time of the groove part. As a result, it is possible to increase the manufacturing efficiency.

Moreover, since the dimension in the first direction in the penetrating part becomes larger than that of the groove part, it is possible to make the penetrating part function as an ink flow channel together with the jet channel when the liquid flows along the first direction through the jet channel. Thus, it becomes easy to ensure the flow channel cross-sectional area of the ink flow channel, and thus, the pressure loss can be reduced.

(4) In the head chip according to one of the aspects (1) and (2) described above, it is preferable that the channel opening surface faces to a thickness direction of the actuator plate, and the penetrating part protrudes toward one side in the first direction with respect to the groove part.

According to the present aspect, since the dimension in the first direction in the groove part becomes smaller than that of the penetrating part, it is possible to shorten the processing time of the groove part. As a result, it is possible to increase the manufacturing efficiency.

Moreover, since the dimension in the first direction in the penetrating part becomes larger than that of the groove part, it is possible to make the penetrating part function as an ink flow channel together with the jet channel when the liquid flows along the first direction through the jet channel. Thus, it becomes easy to ensure the flow channel cross-sectional area of the ink flow channel, and thus, the pressure loss can be reduced.

In particular, by making the groove part protrude in a direction in which the pressure is apt to be high out of the both sides in the first direction with respect to the groove part, it is possible to shorten the processing time of the penetrating part as much as possible while reducing the pressure loss at the one side in the first direction.

(5) In the head chip according to any of the aspects (1) through (4) described above, it is preferable that in a thickness direction of the intermediate plate, a dimension from the first opening part to a bottom surface of the groove part is larger than a dimension from the bottom surface of the groove part to the second opening part.

According to the present aspect, since the depth of the groove part can be ensured, it is possible to use a space located at the outer side in the second direction with respect to the penetrating part in the groove part as the adhesive containing part when bonding the intermediate plate and the jet hole plate to each other. Therefore, it is possible to prevent the adhesive from inflowing into the penetrating part to thereby prevent the adhesive from affecting the jet performance.

(6) In the head chip according to any of the aspects (1) through (5) described above, it is preferable that in a portion located closer to the penetrating part in the second direction in the bottom surface of the groove part, a bulging part bulging from the bottom surface is formed.

According to the present aspect, when bonding the intermediate plate and the jet hole plate to each other, a space located outside in the second direction of the bulging part in the groove part can be used as the adhesive containing part. In this case, since it is possible to restrict the adhesive from inflowing into the penetrating part with the bulging part, it is possible to prevent the adhesive from affecting the jet performance.

(7) A liquid jet head according to an aspect of the present disclosure includes the head chip according to any of the aspects (1) through (6) described above.

According to the present aspect, since the head chip according to the aspect described above is provided, it is possible to provide the liquid jet head high in quality and excellent in reliability.

(8) A liquid jet recording device according to an aspect of the present disclosure includes the liquid jet head according to the aspect (10) described above.

According to the present aspect, it is possible to provide a liquid jet recording device high in quality and excellent in reliability.

(9) A method of manufacturing a head chip according to an aspect of the present disclosure is a method of manufacturing a head chip including an actuator plate in which a plurality of jet channels extending in a first direction is arranged in a second direction crossing the first direction, a jet hole plate which has a plurality of jet holes configured to jet liquid, and which is disposed so as to be opposed to a channel opening surface on which the jet channels open in the actuator plate, and an intermediate plate which has communication holes configured to respectively communicate the jet channels and the jet holes with each other, and which is disposed between the actuator plate and the jet hole plate, the method including a communication hole formation step of providing the communication hole to the intermediate plate, and a jet hole plate stacking step of stacking the jet hole plate on the intermediate plate, wherein the communication hole formation step includes a groove part formation step of recessing the intermediate plate toward a direction away from the jet hole plate to provide the intermediate plate with a groove part having a first opening part opening toward the jet hole, and a penetrating part formation step of penetrating the intermediate plate in an area including at least the groove part to thereby provide the intermediate plate with a penetrating part having a second opening part opening toward the jet channel, in the groove part formation step, a dimension in the second direction in the first opening part is set larger than a dimension in the second direction in the second opening part, in the penetrating part formation step, a dimension in the second direction in the second opening part is set no larger than a dimension in the second direction of a channel opening part opening on the channel opening surface in the jet channel, and in the jet hole plate stacking step, the jet hole plate is stacked on the intermediate plate so that the first opening part and the jet hole are communicated with each other.

(10) In the method of manufacturing the head chip according to the aspect (9) described above, it is preferable to further include an intermediate plate stacking step of stacking the intermediate plate on the channel opening surface of the actuator plate, wherein the groove part formation step is performed before the intermediate plate stacking step.

According to the present aspect, by providing the groove parts in advance to the intermediate plate, it is possible to shorten the processing time after stacking the intermediate plate until the head chip is completed.

(11) In the method of manufacturing the head chip according to the aspect (9) described above, it is preferable to further include an intermediate plate stacking step of stacking the intermediate plate on the channel opening surface of the actuator plate, wherein the groove part formation step and the penetrating part formation step are performed after the intermediate plate stacking step.

According to the present aspect, by forming the groove parts and the penetrating parts in the state in which the intermediate plate is stacked on the actuator plate, it is possible to increase the positional accuracy between the jet channels, and the communication holes.

According to an aspect of the present disclosure, it is possible to ensure the tolerance of the displacement between the jet hole and the communication hole to achieve the miniaturization of the jet channels and the reduction in pitch of the jet channels while ensuring the bonding area between the actuator plate and the intermediate plate to enhance the durability of the head chip.

DETAILED DESCRIPTION OF THE PREFERRED EMBODIMENTS

Figure 1:
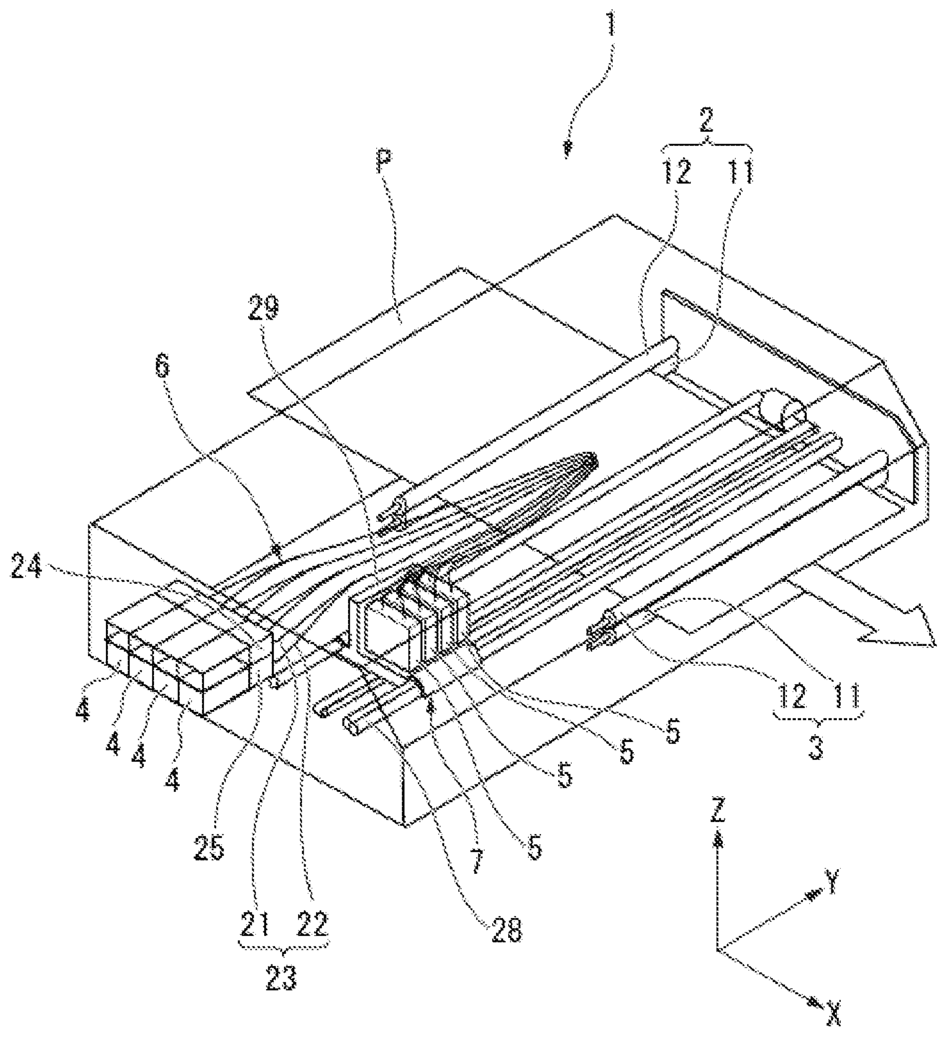
FIG. 1 is a schematic configuration diagram of an inkjet printer according to a first embodiment.

Some embodiments according to the present disclosure will hereinafter be described with reference to the drawings. In the embodiments and modified examples described hereinafter, constituents corresponding to each other are denoted by the same reference symbols to omit the description thereof in some cases. It should be noted that in the following description, expressions representing relative or absolute arrangement such as “parallel,” “perpendicular,” “center,” and “coaxial” not only represent strictly such arrangements, but also represent the state of being relatively displaced with a tolerance, or an angle or a distance to the extent that the same function can be obtained. In the following embodiments, the description will be presented citing an inkjet printer (hereinafter simply referred to as a printer) for performing recording on a recording target medium using ink (liquid) as an example. It should be noted that the scale size of each member is arbitrarily modified so as to provide a recognizable size to the member in the drawings used in the following description.

[Printer 1]

FIG. 1 is a schematic configuration diagram of the printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, the X direction coincides with the conveying direction (a sub-scanning direction) of a recording target medium P (e.g., paper). The Y direction coincides with a scanning direction (a main scanning direction) of the scanning mechanism 7. The Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink in accordance with the ink tanks 4 coupled thereto.

Figure 2:
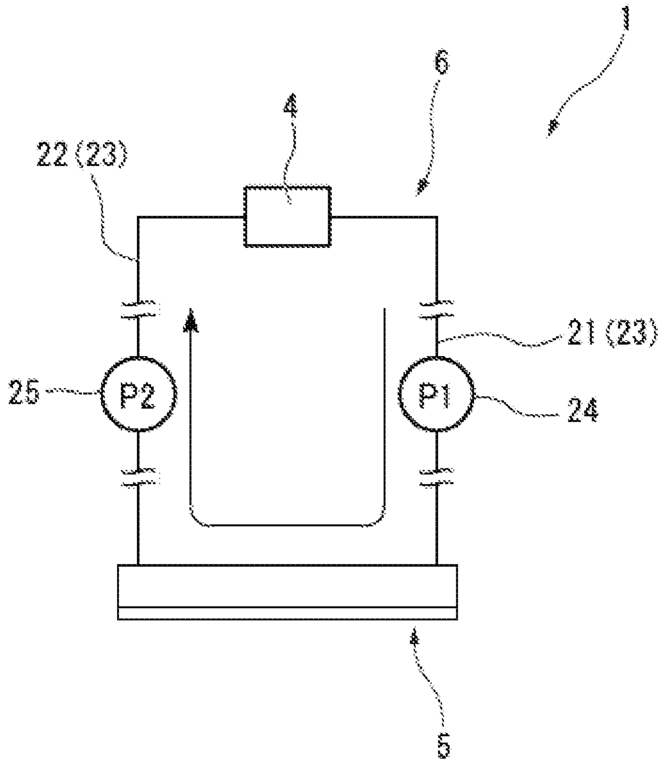
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes the inside of the ink supply tube 21 to deliver the ink to the inkjet head 5 through the ink supply tube 21. Thus, the ink supply tube 21 is provided with positive pressure with respect to the inkjet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the inkjet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

<Inkjet Heads 5>

The inkjet heads 5 are mounted on the carriage 29. In the illustrated example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a control section (not shown) for applying a drive voltage to the head chip 50.

<Head Chip 50>

Figure 3:
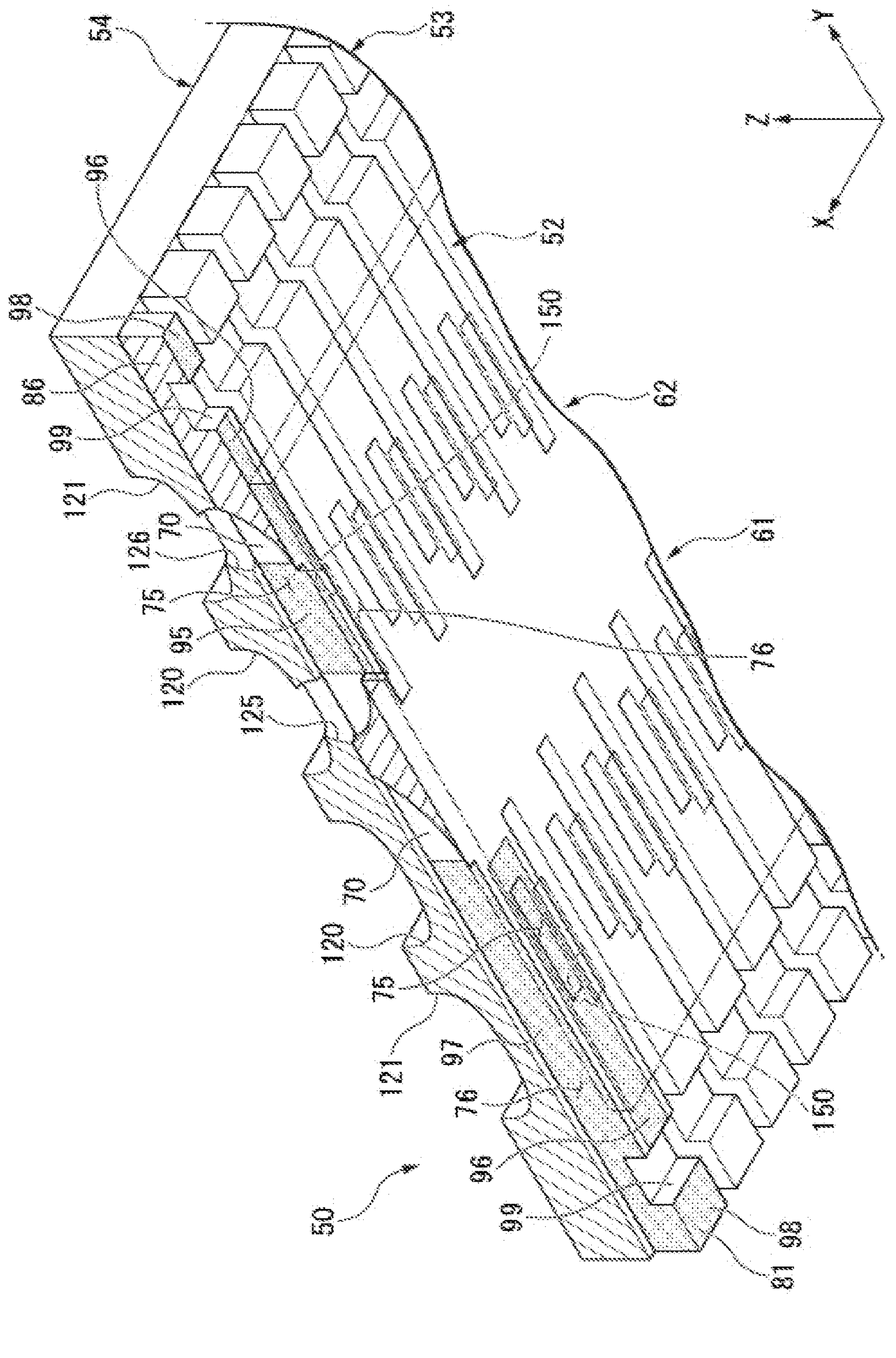
FIG. 3 is a perspective view of a head chip according to the first embodiment viewed from a −Z side in a state in which a nozzle plate is detached.
Figure 4:
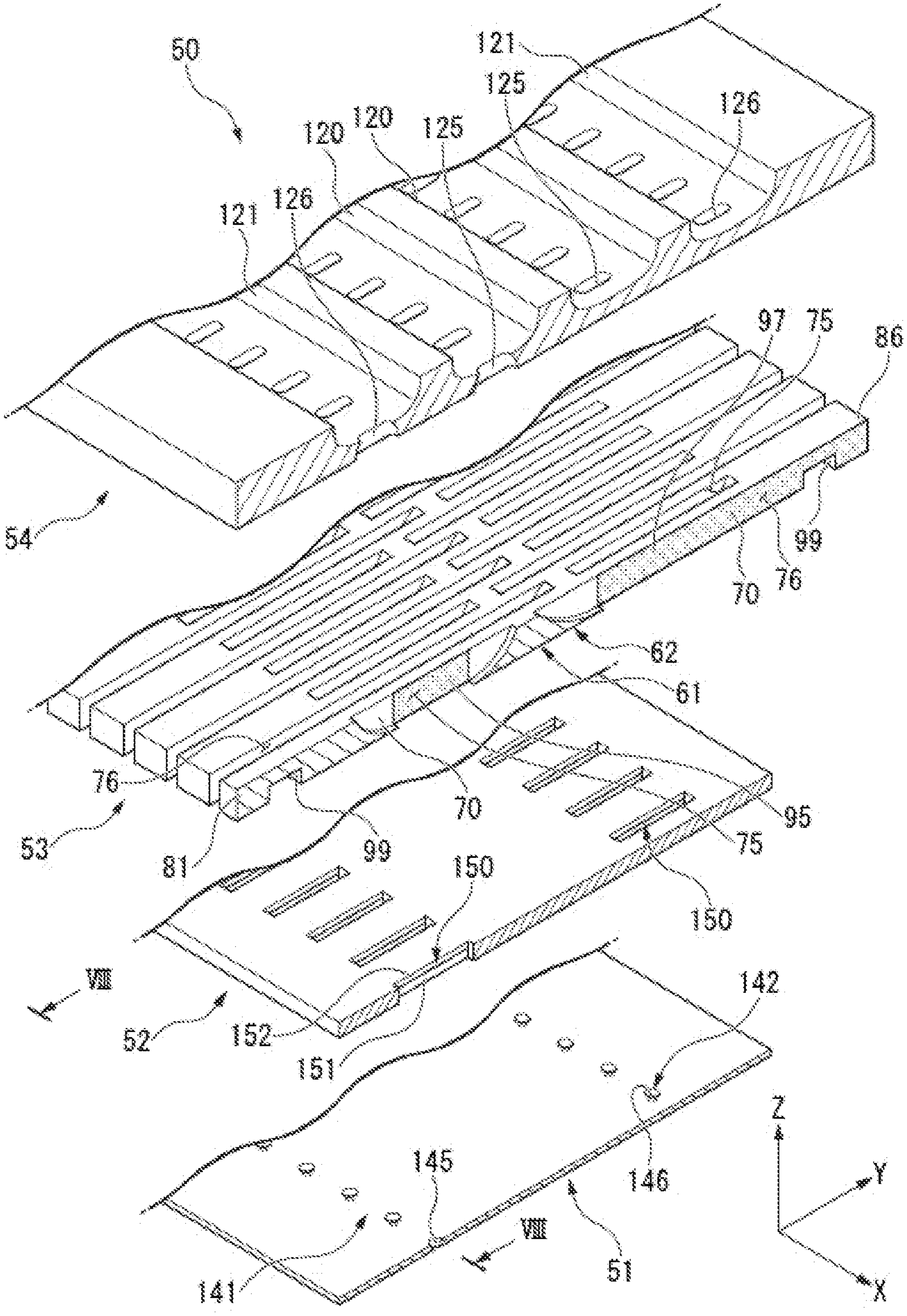
FIG. 4 is an exploded perspective view of the head chip according to the first embodiment.

FIG. 3 is a perspective view of the head chip 50 viewed from the −Z side in the state in which a nozzle plate 51 is detached. FIG. 4 is an exploded perspective view of the head chip 50.

The head chip 50 shown in FIG. 3 and FIG. 4 is a so-called circulating side-shooting type head chip 50 which circulates the ink with the ink tank 4, and at the same time, ejects the ink from a central portion in the extending direction (the Y direction) in an ejection channel 75 described later. The head chip 50 is provided with the nozzle plate 51 (see FIG. 4), an intermediate plate 52, an actuator plate 53, and a cover plate 54. The head chip 50 is provided with a configuration in which the nozzle plate 51, the intermediate plate 52, the actuator plate 53, and the cover plate 54 are stacked on one another in this order in the Z direction. In the following explanation, the description is presented in some cases defining a direction (+Z side) from the nozzle plate 51 toward the cover plate 54 along the Z direction as an upper side, and a direction (−Z side) from the cover plate 54 toward the nozzle plate 51 along the Z direction as a lower side.

The actuator plate 53 is formed of a piezoelectric material such as PZT (lead zirconate titanate). The actuator plate 53 is a so-called chevron substrate formed by, for example, stacking two piezoelectric plates different in polarization direction in the Z direction on one another. It should be noted that the actuator plate 53 can be a so-called monopole substrate in which the polarization direction is unidirectional throughout the entire area in the Z direction.

Figure 5:
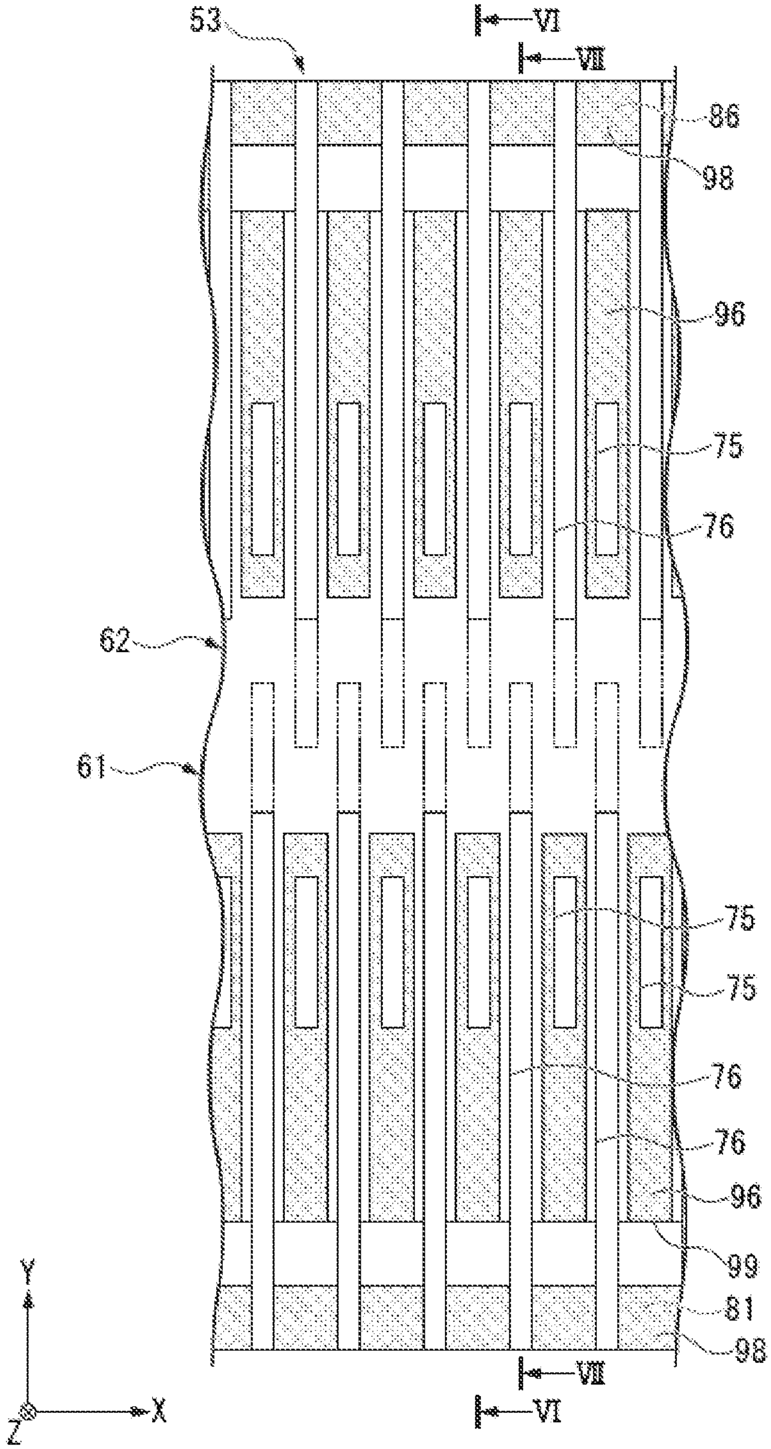
FIG. 5 is a bottom view of an actuator plate related to the first embodiment.

FIG. 5 is a bottom view of the actuator plate 53.

As shown in FIG. 4 and FIG. 5, the actuator plate 53 is provided with a plurality of (e.g., two) channel columns 61, 62. In the present embodiment, the channel columns 61, 62 correspond to a first channel column 61 and a second channel column 62. The channel columns 61, 62 extend in the X direction, and at the same time, are arranged at a distance in the Y direction.

The configuration of the channel columns 61, 62 will hereinafter be described citing the first channel column 61 as an example.

The first channel column 61 has the ejection channels (jet channels) 75 filled with the ink, and non-ejection channels (non-jet channels) 76 not filled with the ink. The channels 75, 76 each extend linearly in the Y direction (a first direction, a third direction), and at the same time, are alternately arranged side by side at intervals in the X direction (a second direction) in a plan view viewed from the Z direction. In the actuator plate 53, a portion located between the ejection channel 75 and the non-ejection channel 76 constitutes a drive wall 70 (see FIG. 4) which partitions the ejection channel 75 and the non-ejection channel 76 from each other in the X direction. It should be noted that the configuration in which the channel extension direction coincides with the Y direction will be described in the present embodiment, but the channel extension direction can cross the Y direction.

Figure 6:
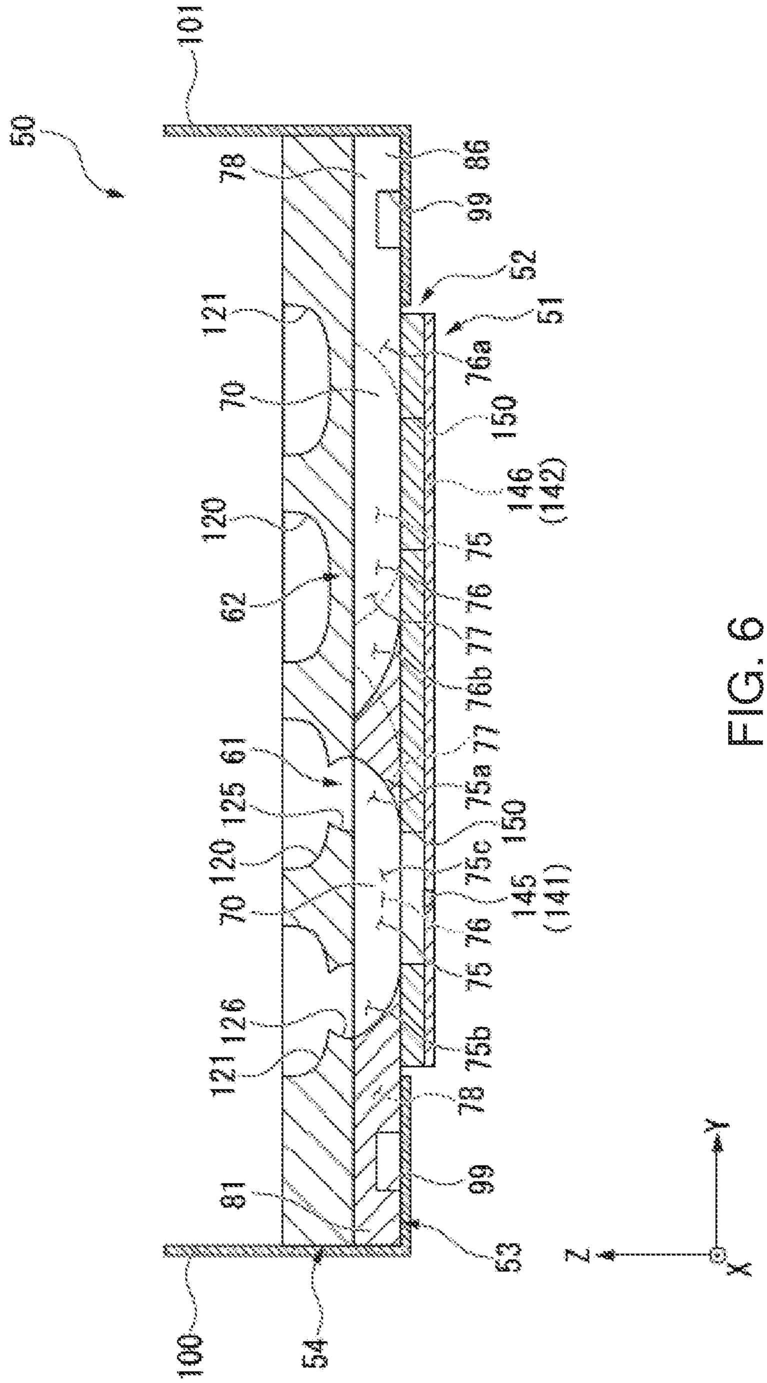
FIG. 6 is a cross-sectional view corresponding to a line VI-VI shown in FIG. 5.

FIG. 6 is a cross-sectional view corresponding to a line VI-VI shown in FIG. 5.

As shown in FIG. 6, the ejection channel 75 is formed to have a circular arc shape convex downward in a side view viewed from the X direction. The ejection channels 75 are formed by, for example, making a dicer having a disk-like shape enter the actuator plate 53 from above (the +Z side) the actuator plate 53. Specifically, the ejection channels 75 each have a first uprise part 75*a* located in a +Y-side end portion, a second uprise part 75*b* located in a −Y-side end portion, and an ejection-side penetrating part 75*c* located between the uprise parts 75*a*, 75*b*.

The uprise parts 75*a*, 75*b* each have a circular arc shape constant in curvature radius viewed from the X direction. The uprise parts 75*a*, 75*b* each decrease in depth in the Z direction as getting away from the ejection-side penetrating part 75*c* in the Y direction.

The ejection-side penetrating part 75*c* penetrates the actuator plate 53 in the Z direction in a central portion in the Y direction in the ejection channel 75. Therefore, the ejection channel 75 has an upper-side opening part in which the whole (the uprise parts 75*a*, 75*b* and the ejection-side penetrating part 75*c*) of the ejection channel 75 opens on an upper surface of the actuator plate 53, and a lower-side opening part (a channel opening part) in which only the ejection-side penetrating part 75*c* opens on a lower surface (a channel opening surface) of the actuator plate 53.

Figure 7:
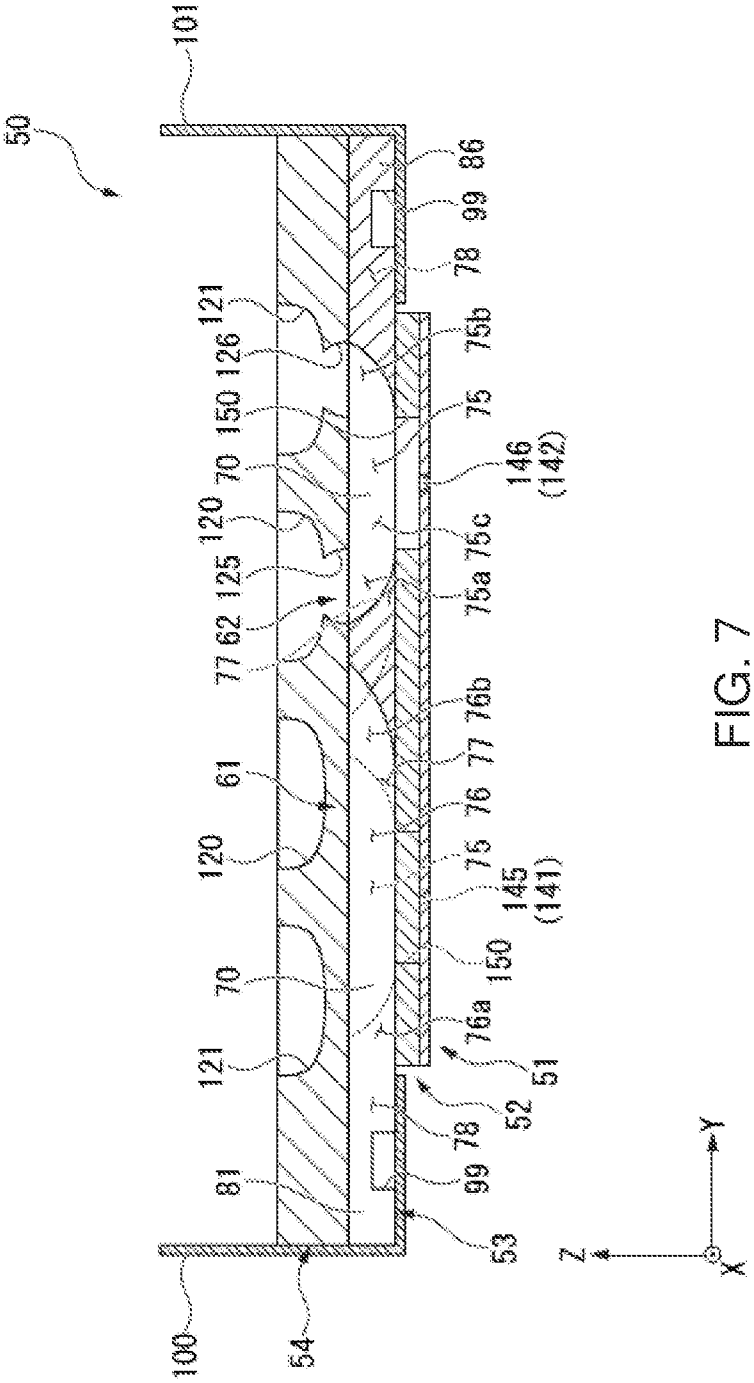
FIG. 7 is a cross-sectional view corresponding to a line VII-VII shown in FIG. 5.

FIG. 7 is a cross-sectional view corresponding to a line VII-VII shown in FIG. 5.

As shown in FIG. 7, the non-ejection channel 76 is adjacent to the ejection channel 75 across the drive wall 70 in the X direction. The non-ejection channels 76 are formed by, for example, making a dicer having a disk-like shape enter the actuator plate 53 from above the actuator plate 53. The non-ejection channel 76 is provided with a non-ejection-side penetrating part 76*a* and an uprise part 76*b*.

The non-ejection-side penetrating part 76*a* penetrates the actuator plate 53 in the Z direction. In other words, the non-ejection-side penetrating part 76*a* is formed to have a uniform groove depth in the Z direction. The non-ejection-side penetrating part 76*a* constitutes a portion other than the +Y-side end portion in the non-ejection channel 76. The non-ejection-side penetrating part 76*a* is opened outside the head chip 50 through an end surface opening part formed on an end surface facing to the −Y side in the actuator plate 53.

The uprise part 76*b* constitutes the +Y-side end portion in the non-ejection channel 76. The uprise part 76*b* has a circular arc shape constant in curvature radius viewed from the X direction. The uprise part 76*b* decreases in depth in the Z direction as getting away from the non-ejection-side penetrating part 76*a* in the Y direction.

As shown in FIG. 6 and FIG. 7, the dimension in the Y direction of the non-ejection channel 76 (the non-ejection-side penetrating part 76*a*) is made larger than that of the ejection channel 75. Specifically, the +Y-side end portion of the non-ejection-side penetrating part 76*a* constitutes a first protruding part 77 located at the +Y side of the ejection channel 75 (the ejection-side penetrating part 75*c*). The −Y-side end portion of the non-ejection-side penetrating part 76*a* constitutes a second protruding part 78 located at the −Y side of the ejection channel 75 (the ejection-side penetrating part 75*c*).

As shown in FIG. 5, the second channel column 62 has a configuration in which the ejection channels (jet channels) 75 and the non-ejection channels (non-jet channels) 76 are arranged alternately in the X direction similarly to the first channel column 61. Specifically, the ejection channels 75 and the non-ejection channels 76 in the second channel column 62 are arranged so as to be shifted as much as a half pitch with respect to the arrangement pitch of the ejection channels 75 and the non-ejection channels 76 in the first channel column 61. Therefore, in the inkjet head 5 according to the present embodiment, the ejection channels 75 of the first channel column 61 and the second channel column 62 are arranged in a zigzag manner (a staggered manner), and the non-ejection channels 76 of the first channel column 61 and the second channel column 62 are arranged in a zigzag manner (a staggered manner). In other words, the ejection channel 75 and the non-ejection channel 76 are opposed to each other in the Y direction between the channel columns 61, 62 adjacent to each other. It should be noted that the arrangement pitch of the ejection channels 75 and the arrangement pitch of the non-ejection channels 76 can arbitrarily be changed between the channel columns 61, 62. For example, between the channel columns 61, 62, the ejection channels 75 can be arranged so as to be opposed to each other in the Y direction, and the non-ejection channels 76 can be arranged so as to be opposed to each other in the Y direction.

In the channel columns 61, 62, the ejection channels 75 are formed in a plane-symmetrical manner with respect to an X-Z plane. In the channel columns 61, 62, the non-ejection channels 76 are formed in a plane-symmetrical manner with respect to the X-Z plane. In the channel columns 61, 62, the respective uprise parts 76*b* at least partially overlap each other when viewed from the X direction. It should be noted that the respective uprise parts 76*b* of the channel columns 61, 62 are not required to overlap each other when viewed from the X direction.

In the actuator plate 53, a portion located at the −Y side (at an opposite side to the second channel column 62) of the ejection channel 75 (the ejection-side penetrating part 75*c*) of the first channel column 61 constitutes a first tail part 81.

In the actuator plate 53, a portion located at the +Y side (at an opposite side to the first channel column 61) of the ejection channel 75 of the second channel column 62 constitutes a second tail part 86.

Figure 8:
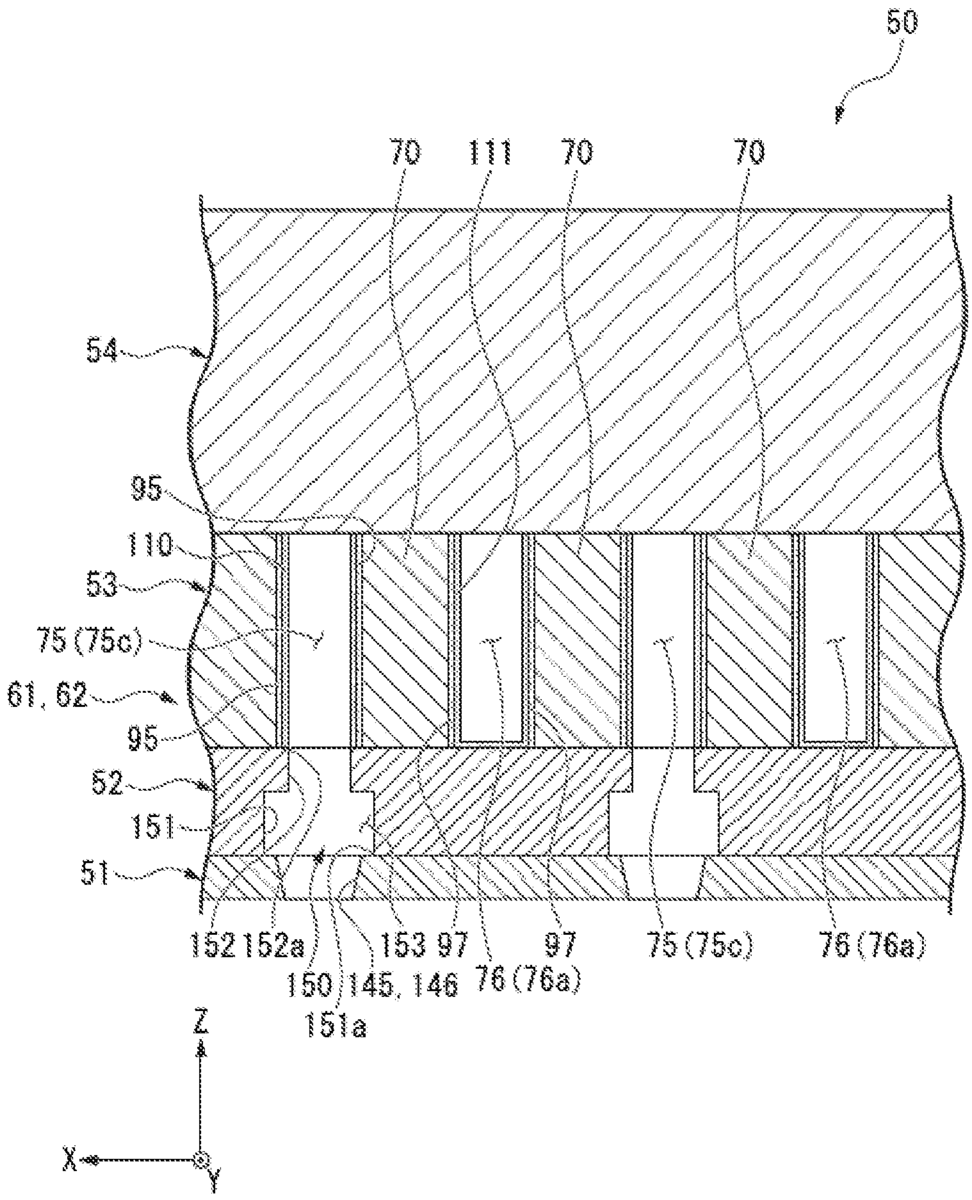
FIG. 8 is a cross-sectional view along a line VIII-VIII shown in FIG. 4.

FIG. 8 is a cross-sectional view along a line VIII-VIII shown in FIG. 4.

As shown in FIG. 8, on inner side surfaces (surfaces opposed to each other in the X direction in the inner surfaces of the ejection channel 75) facing each of the ejection channels 75 in the drive walls 70 of the actuator plate 53, there are respectively formed common electrodes 95. The common electrodes 95 are made equivalent in length in the Y direction to the ejection-side penetrating part 75*c* (equivalent in length to an opening of the ejection channel 75 on the lower surface of the actuator plate 53). The common electrodes 95 are each formed throughout the entire area in the Z direction on the inner side surface of the ejection-side penetrating part 75*c*.

As shown in FIG. 5, on the lower surface of the actuator plate 53, there is formed a plurality of common terminals 96. The common terminals 96 are made to have strip-like shapes extending in the Y direction in parallel to each other. The common terminals 96 are each coupled to the pair of common electrodes 95 at an opening edge of the ejection channel 75 corresponding to the common terminal 96. The common terminals 96 are each terminated on a lower surface of corresponding one of the tail parts 81, 86.

As shown in FIG. 8, on inner side surfaces (surfaces opposed to each other in the X direction in the non-ejection channel 76) facing each of the non-ejection channels 76 in the drive walls 70 of the actuator plate 53, there are respectively formed individual electrodes 97. The individual electrodes 97 are made equivalent in length in the Y direction to the non-ejection-side penetrating part 76*a*. The individual electrodes 97 are each formed throughout the entire area in the Z direction on the inner side surface of the non-ejection-side penetrating part 76*a*.

As shown in FIG. 5, in portions located at an outer side of the common terminals 96 on the lower surfaces of the tail parts 81, 86, there are formed individual terminals 98. The individual terminal 98 is made to have a strip-like shape extending in the X direction. The individual terminal 98 couples the individual electrodes 97 opposed to each other in the X direction across the ejection channel 75 at the opening edges of the non-ejection channels 76 which are opposed to each other in the X direction across the ejection channel 75. It should be noted that in a portion located between the common terminal 96 and the individual terminal 98 in each of the tail parts 81, 86, there is formed a compartment groove 99. The compartment grooves 99 extend in the X direction in the tail parts 81, 86. The compartment groove 99 separates the common terminal 96 and the individual terminal 98 from each other.

As shown in FIG. 8, on the inner surface of the ejection channel 75, there is formed a first protective film 110. The first protective film 110 is formed throughout the entire inner surface of the ejection channel 75. The first protective film 110 covers the common electrode 95. The first protective film 110 prevents, for example, the common electrode 95 and the ink from making contact with each other. It should be noted that it is sufficient for the first protective film 110 to cover at least the common electrode 95 on the inner side surface of the ejection channel 75.

On an inner surface of the non-ejection channel 76, there is formed a second protective film 111. The second protective film 111 is formed throughout the entire inner surface of the non-ejection channel 76. The second protective film 111 covers the individual electrode 97. The second protective film 111 prevents, for example, the individual electrode 97 and the ink from making contact with each other. It should be noted that it is sufficient for the second protective film 111 to cover at least the individual electrode 97 on the inner side surface of the non-ejection channel 76.

The protective films 110, 111 each include an organic insulating material such as a para-xylylene resin material (e.g., parylene (a registered trademark)) as a material having an insulating property. The protective films 110, 111 can be formed of tantalum oxide ($Ta_2O_5$), silicon nitride (SiN), silicon carbide (SiC), silicon oxide ($SiO_2$), diamond-like carbon, or the like, or can include at least any one of these materials.

As shown in FIG. 6, a first flexible printed board 100 is pressure-bonded to the lower surface of the first tail part 81. The first flexible printed board 100 is coupled to the common terminals 96 and the individual terminals 98 corresponding to the first channel column 61 on the lower surface of the first tail part 81. The first flexible printed board 100 is extracted upward passing through the outside of the actuator plate 53.

A second flexible printed board 101 is pressure-bonded to the lower surface of the second tail part 86. The second flexible printed board 101 is coupled to the common terminals 96 and the individual terminals 98 corresponding to the second channel column 62 on the lower surface of the second tail part 86. The second flexible printed board 101 is extracted upward through the outside of the actuator plate 53.

<Cover Plate 54>

As shown in FIG. 3 and FIG. 4, the cover plate 54 is bonded to an upper surface of the actuator plate 53 so as to close the channel columns 61, 62. In the cover plate 54, at positions corresponding to the channel columns 61, 62, there are formed entrance common ink chambers 120 and exit common ink chambers 121, respectively.

The entrance common ink chamber 120 is formed at a position overlapping, for example, the +Y-side end portion of the first channel column 61 in the plan view. The entrance common ink chamber 120 extends in the X direction with a length sufficient for straddling, for example, the first channel column 61, and at the same time, opens on an upper surface of the cover plate 54.

The exit common ink chamber 121 is formed at a position overlapping, for example, the −Y-side end portion of the first channel column 61 in the plan view. The exit common ink chamber 121 extends in the X direction with a length sufficient for straddling the first channel column 61, and at the same time, opens on the upper surface of the cover plate 54.

In the entrance common ink chamber 120, at positions overlapping the ejection channels 75 (the first uprise parts 75*a*) in the first channel column 61, there are formed entrance slits 125. The entrance slits 125 each make the ejection channel 75 and the entrance common ink chamber 120 communicate with each other.

In the exit common ink chamber 121, at positions overlapping the ejection channels 75 (the second uprise parts 75*b*) in the first channel column 61 in the plan view, there are formed exit slits 126. The exit slits 126 each make the ejection channel 75 and the exit common ink chamber 121 communicate with each other. Therefore, the entrance slits 125 and the exit slits 126 are communicated with the respective ejection channels 75 on the one hand, but are not communicated with the non-ejection channels 76 on the other hand.

<Intermediate Plate 52>

The intermediate plate 52 is bonded to the lower surface of the actuator plate 53 so as to close the channel columns 61, 62. The intermediate plate 52 is formed of a piezoelectric material such as PZT similarly to the actuator plate 53. The intermediate plate 52 is thinner in thickness in the Z direction than the actuator plate 53. The intermediate plate 52 is made smaller in dimension in the Y direction than the actuator plate 53. Therefore, at the both sides in the Y direction of the intermediate plate 52, there are exposed the both end portions (the tail parts 81, 86) in the Y direction in the actuator plate 53. In the both end portions in the Y direction in the actuator plate 53, the portions exposed from the intermediate plate 52 function as pressure-bonding areas for the first flexible printed board 100 and the second flexible printed board 101, respectively. It should be noted that the intermediate plate 52 can be formed of a material (e.g., a nonconductive material such as polyimide or alumina) other than the piezoelectric material.

<Nozzle Plate 51>

As shown in FIG. 4, the nozzle plate 51 is fixed by bonding or the like to a lower surface of the intermediate plate 52. The nozzle plate 51 is made equivalent in width in the Y direction to the intermediate plate 52. In the present embodiment, the nozzle plate 51 is formed of a resin material such as polyimide so as to have a thickness of about 50 μm. It should be noted that it is possible for the nozzle plate 51 to have a single layer structure or a laminate structure with a metal material (SUS, Ni—Pd, or the like), glass, silicone, or the like besides the resin material.

The nozzle plate 51 is provided with two nozzle arrays (a first nozzle array 141 and a second nozzle array 142) extending in the X direction formed at a distance in the Y direction.

The nozzle arrays 141, 142 each include a plurality of nozzle holes (first nozzle holes 145 and second nozzle holes 146) each penetrating the nozzle plate 51 in the Z direction.

The nozzle holes 145 and the nozzle holes 146 are each arranged at intervals in the X direction. Each of the nozzle holes 145, 146 is formed to have, for example, a taper shape having an inner diameter gradually decreasing in a direction from the lower side toward the upper side. In the illustrated example, the maximum inner diameter (the inner diameter of an upper-side opening part) of each of the nozzle holes 145, 146 is set no smaller than the dimension in the X direction in the ejection channel 75.

Figure 9:
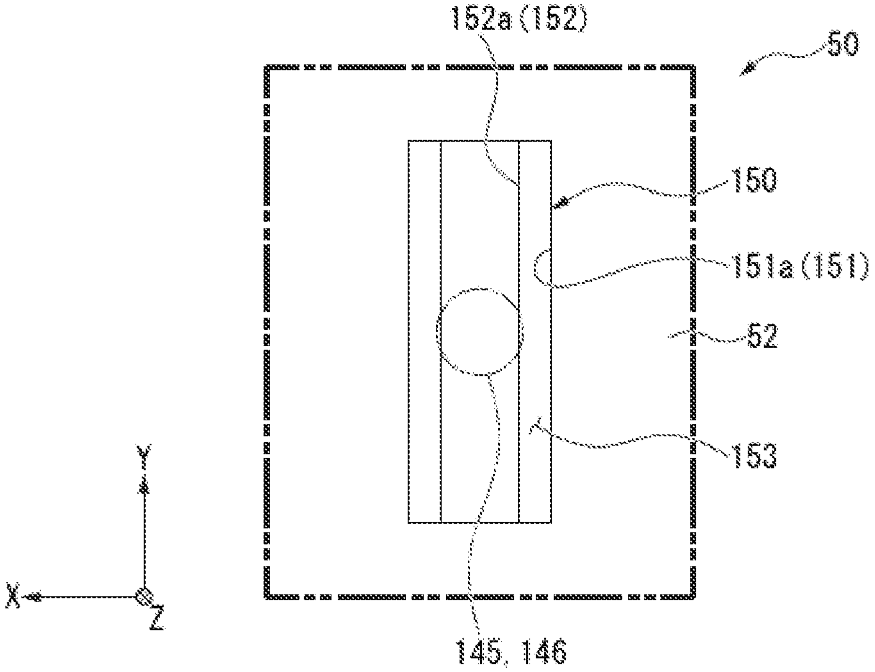
FIG. 9 is an enlarged bottom view of the head chip according to the first embodiment in a state in which the nozzle plate is detached.

FIG. 9 is an enlarged bottom view of the head chip 50 in a state in which the nozzle plate 51 is detached.

Here, as shown in FIG. 8 and FIG. 9, in the intermediate plate 52, at positions overlapping the nozzle holes 145, 146 in the plan view, there are formed communication holes 150. The communication holes 150 each make the ejection channel 75 and the nozzle hole 145, 146 corresponding to each other communicate with each other out of the plurality of ejection channels 75 and the plurality of nozzle holes 145, 146. Therefore, the non-ejection channels 76 are not communicated with the nozzle holes 145, 146, but are covered with the intermediate plate 52 from below. It should be noted that the communication holes 150 have substantially the same configurations as each other. Therefore, in the following description, the detail of the communication holes 150 will be explained citing one of the communication holes 150 as an example.

The communication hole 150 is formed to have a step shape having a width in the X direction gradually increasing in a direction from the upper side toward the lower side when viewed from the Y direction. Specifically, the communication hole 150 is provided with a groove part 151 and a penetrating part 152.

The groove part 151 is recessed from the lower surface of the intermediate plate 52, and extends in the Y direction. The groove part 151 has a lower-side opening part (a first opening part) 151*a* opening on the lower surface of the intermediate plate 52. The lower-side opening part 151*a* is communicated with the nozzle holes 145, 146 through the upper-side opening part of the nozzle holes 145, 146. The dimension in the Y direction in the groove part 151 is set equivalent to a dimension in the Y direction in the ejection-side penetrating part 75*c*. It should be noted that the dimension in the Y direction in the groove part 151 can be larger or smaller than the dimension in the Y direction in the ejection-side penetrating part 75*c*.

A dimension in the X direction in the groove part 151 is larger than a maximum inner diameter of the nozzle holes 145, 146 and a dimension in the X direction in the ejection channel 75. In the present embodiment, it is preferable for the dimension in the X direction in the groove part 151 to be 1.5 times or more as large as the maximum inner diameter of the nozzle holes 145, 146, and no larger than an arrangement pitch of the ejection channels 75 and the non-ejection channels 76.

The dimension in the Z direction in the groove part 151 is set no smaller than a half of a dimension in the Z direction in the intermediate plate 52. In other words, a dimension in the Z direction from the lower surface of the intermediate plate 52 to a bottom surface of the groove part 151 is larger than a dimension in the Z direction from the bottom surface of the groove part 151 to the upper surface (the upper-side opening part 152*a* of the penetrating part 152) of the intermediate plate 52. Therefore, the bottom surface of the groove part 151 is located at the upper side with respect to the center in the Z direction in the intermediate plate 52. It should be noted that the dimension in the Z direction in the groove part 151 can arbitrarily be changed.

The penetrating part 152 extends in the Z direction in an area including the groove part 151 of the intermediate plate 52. The penetrating part 152 is communicated with the groove part 151 to thereby penetrate the intermediate plate 52. The penetrating part 152 has an upper-side opening part (an upper-side opening part) 152*a* opening on the upper surface of the intermediate plate 52. The upper-side opening part 152*a* is communicated with the ejection channel 75 through the lower-side opening part of the ejection channel 75 (the ejection-side penetrating part 75*c*).

In the present embodiment, the whole of the penetrating part 152 overlaps the groove part 151 in the plan view. Specifically, a dimension in the Y direction in the penetrating part 152 is made equivalent to the dimension in the Y direction in the groove part 151.

A dimension in the X direction in the penetrating part 152 is set no larger than the dimension in the X direction in the ejection channel 75. In the present embodiment, the dimension in the X direction in the penetrating part 152 is preferably no lower than 75% and no higher than 100% with respect to the dimension in the X direction in the ejection channel 75, and more preferably no lower than 90% and no higher than 100% thereof.

A dimension in the X direction in the penetrating part 152 is made smaller than the dimension in the X direction in the groove part 151. In the present embodiment, the penetrating part 152 is communicated with the groove part 151 in the central portion in the X direction in the groove part 151. Therefore, the groove part 151 projects at both sides in the X direction with respect to the penetrating part 152. In the internal space of the groove part 151, a portion (a space located between the bottom surface of the groove part 151 and the upper surface of the nozzle plate 51) located at both sides in the X direction with respect to the penetrating part 152 constitutes an adhesive containing part 153. The adhesive containing part 153 contains a superfluous adhesive when bonding the nozzle plate 51 to the intermediate plate 52. Thus, it is possible to prevent the adhesive from flowing into a portion overlapping the ejection-side penetrating part 75*c* and the nozzle holes 145, 146 in the plan view in the communication hole 150.

[Operation Method of Printer 1]

Then, there will hereinafter be described a case when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided the state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such circulating side-shooting type inkjet head 5 as in the present embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the ejection channels 75 through the entrance common ink chambers 120 and the entrance slits 125. The ink supplied to the inside of each of the ejection channels 75 circulates the ejection channels 75 in the Y direction. Subsequently, the ink is discharged to the exit common ink chambers 121 through the exit slits 126, and is then returned to the ink tank 4 through the ink discharge tube 22. Thus, it is possible to circulate the ink between the inkjet head 5 and the ink tank 4.

Then, when the reciprocation of the inkjet head 5 is started due to the translation of the carriage 29 (see FIG. 1), the drive voltages are applied to the electrodes 95, 97 via the flexible printed boards 100, 101. On this occasion, the individual electrode 97 is set at a drive potential Vdd, and the common electrode 95 is set at a reference potential GND to apply the drive voltage between the electrodes 95, 97. Then, a thickness shear deformation occurs in the two drive walls 70 partitioning the ejection channel 75, and the two drive walls 70 each deform so as to protrude toward the non-ejection channel 76. Specifically, by applying the voltage between the electrodes 95, 97, the drive walls 70 each make a flexural deformation to form a V-shape centering on an intermediate portion in the Z direction. Thus, the volume of the ejection channel 75 increases. Further, since the volume of the ejection channel 75 has increased, the ink retained in the entrance common ink chamber 120 is induced into the ejection channel 75 through the entrance slit 125. The ink having been induced into the ejection channel 75 propagates inside the ejection channel 75 forming a pressure wave. The voltage applied between the electrodes 95, 97 is set to zero at the timing when the pressure wave reaches corresponding one of the nozzle holes 145, 146. Thus, the drive walls 70 are restored, and the volume of the ejection channel 75 having once increased is restored to the original volume. Due to this operation, the internal pressure of the ejection channel 75 increases to pressurize the ink. As a result, it is possible to record the character, the image, and the like on the recording target medium P as described above by the ink shaped like a droplet being ejected outside through the communication hole 150 and corresponding one of the nozzle holes 145, 146.

<Method of Manufacturing Head Chip 50>

Figure 10:
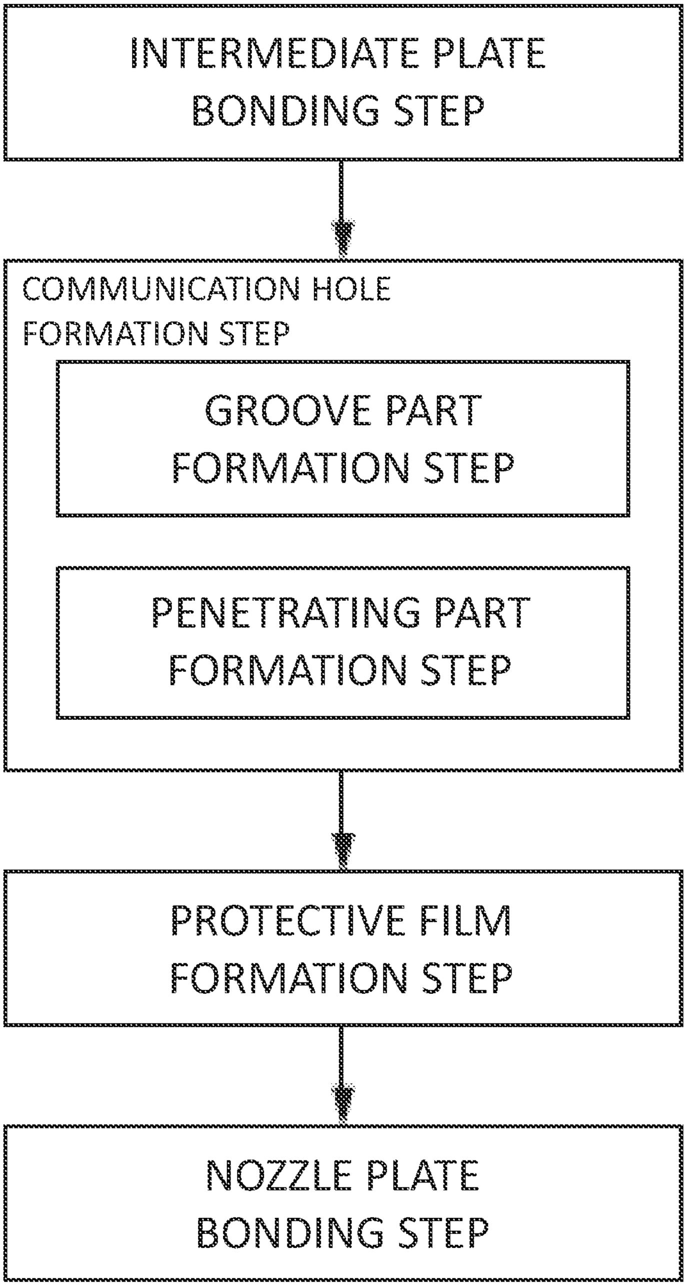
FIG. 10 is a flowchart for explaining a method of manufacturing the head chip according to the first embodiment.

Then, a method of manufacturing such a head chip 50 as described above will be described. FIG. 10 is a flowchart for explaining the method of manufacturing the head chip 50. FIG. 11 through FIG. 14 are each a diagram for explaining a step of the method of manufacturing the head chip 50, and are each a cross-sectional view corresponding to FIG. 8. In the following description, there is described a case when manufacturing the head chip 50 chip by chip as an example for the sake of convenience.

As shown in FIG. 10, the method of manufacturing the head chip 50 is provided with an intermediate plate bonding step (an intermediate plate stacking step), a communication hole formation step, a protective film formation step, and a nozzle plate bonding step (a jet hole plate stacking step). It should be noted that it is assumed that the processing necessary in advance of the intermediate plate bonding step has already been performed on each of the plates 51 through 54.

Figure 11:
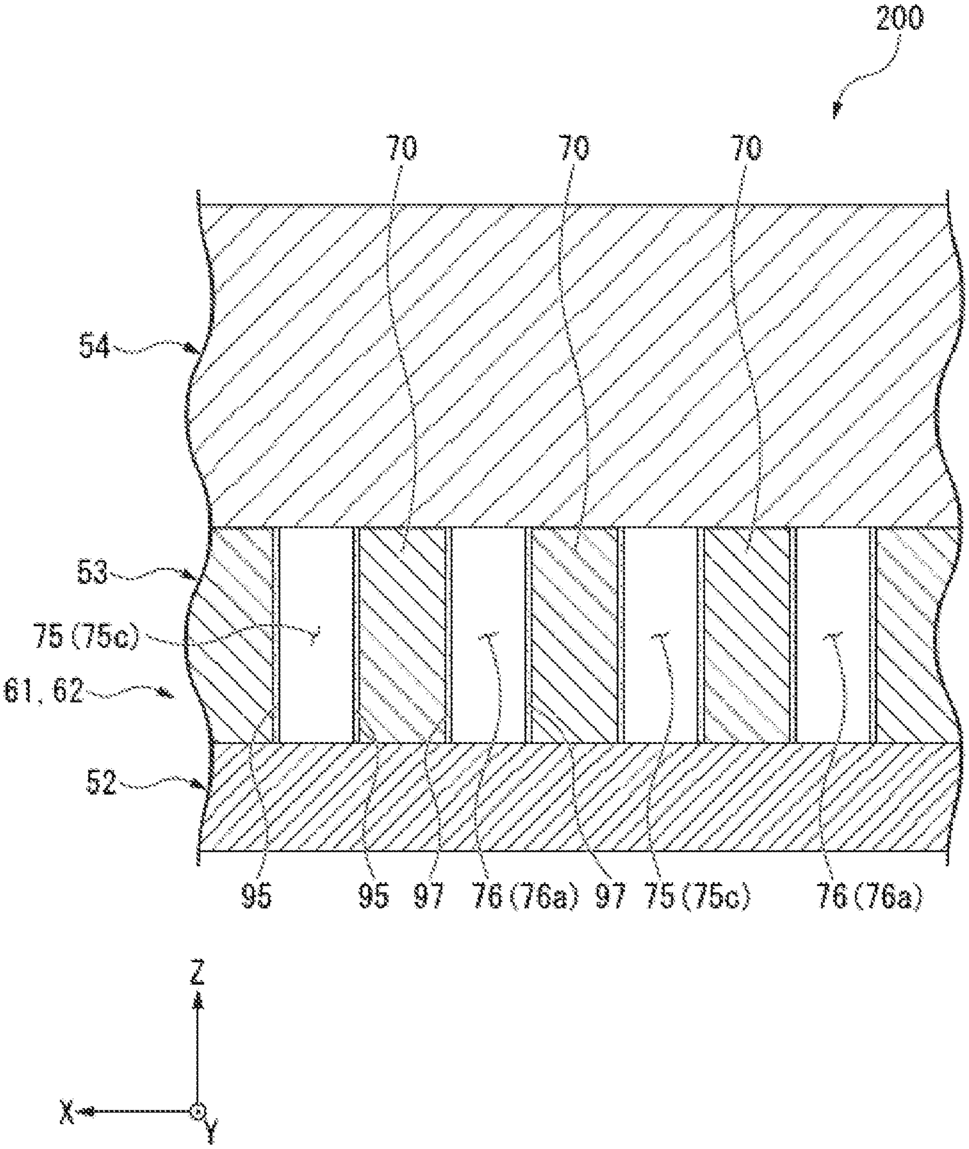
FIG. 11 is a diagram for explaining a step of the method of manufacturing the head chip according to the first embodiment, and is a cross-sectional view corresponding to FIG. 8.

As shown in FIG. 11, in the intermediate plate bonding step, the intermediate plate 52 is bonded to a stacked body 200 having the actuator plate 53 and the cover plate 54 stacked on one another. Specifically, the intermediate plate 52 is bonded to the lower surface of the actuator plate 53 via an adhesive or the like. When performing the intermediate plate bonding step, the intermediate plate 52 has not yet been provided with the communication holes 150.

Figure 12:
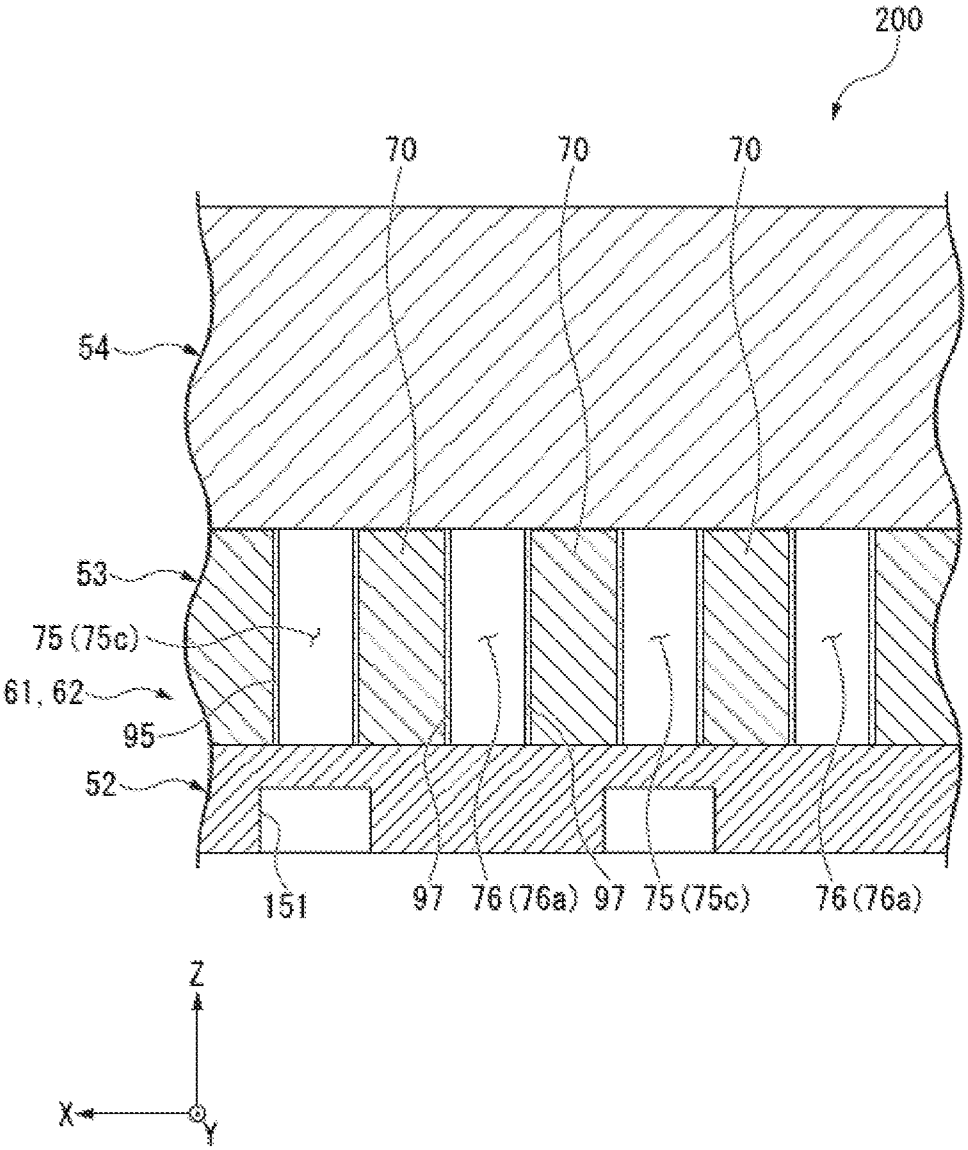
FIG. 12 is a diagram for explaining a step of the method of manufacturing the head chip according to the first embodiment, and is a cross-sectional view corresponding to FIG. 8.
Figure 13:
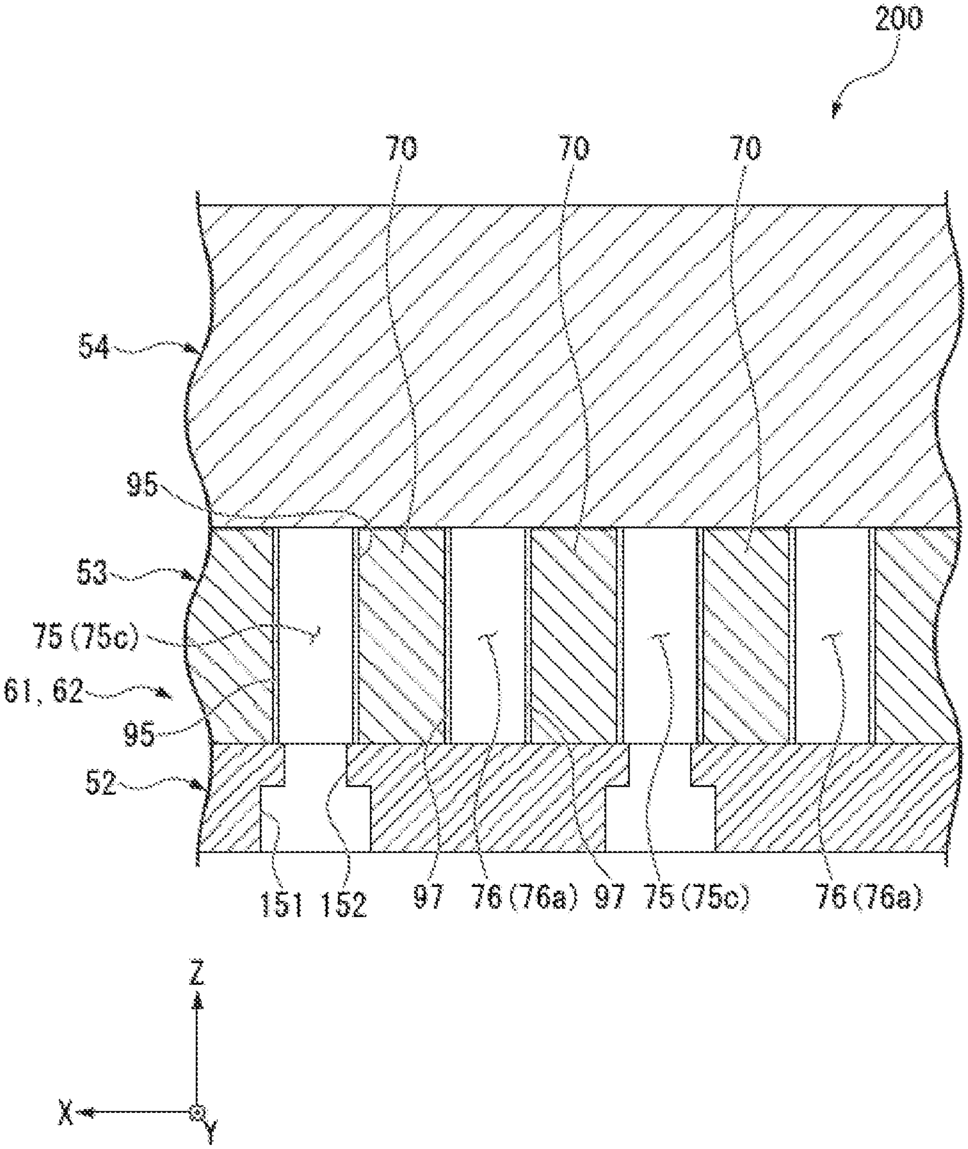
FIG. 13 is a diagram for explaining a step of the method of manufacturing the head chip according to the first embodiment, and is a cross-sectional view corresponding to FIG. 8.

In the communication hole formation step, the communication holes 150 are formed in the intermediate plate 52. Specifically, in the communication hole formation step, laser processing is performed on portions overlapping the ejection channels 75 in the plan view in the lower surface of the intermediate plate 52 to thereby penetrate the intermediate plate 52. In the communication hole formation step, a groove part formation step of forming the groove parts 151 is performed first, and then, a penetrating part formation step of forming the penetrating parts 152 is performed. As shown in FIG. 12, in the groove part formation step, the formation areas of the groove parts 151 are scanned with the laser to thereby form the groove parts 151 recessed in a direction of getting away from the lower surface of the intermediate plate 52. As shown in FIG. 13, in the penetrating part formation step, by scanning the bottom surfaces of the groove parts 151 with the laser from below the intermediate plate 52, the intermediate plate 52 is penetrated. Thus, the groove part 151 becomes communicated with the ejection channel 75 through the penetrating part 152. An irradiation width of the laser in the X direction in the penetrating part formation step is set no larger than the dimension in the X direction in the ejection channel 75. As in the present embodiment, by forming the groove parts 151 and the penetrating parts 152 in the state in which the intermediate plate 52 is stacked on the actuator plate 53, it is possible to improve the positional accuracy between the ejection channels 75 and the communication holes 150. It should be noted that the communication hole formation step can be achieved by etching or the like besides the laser processing.

Figure 14:
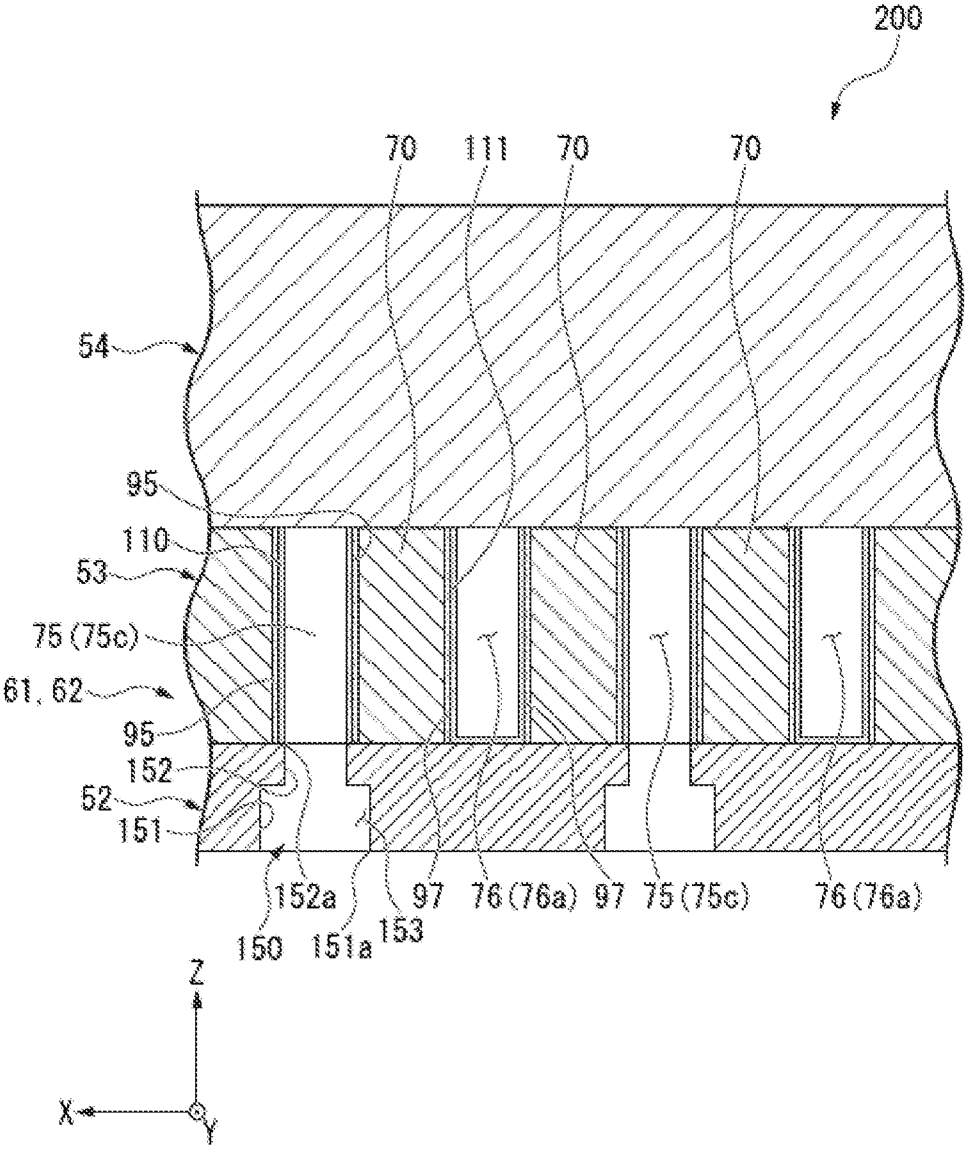
FIG. 14 is a diagram for explaining a step of the method of manufacturing the head chip according to the first embodiment, and is a cross-sectional view corresponding to FIG. 8.

As shown in FIG. 14, in the protective film formation step, the first protective film 110 is formed in each of the ejection channels 75, and at the same time, the protective film 111 is formed on the inner surface of each of the non-ejection channels 76. The protective films 110, 111 are formed by depositing a para-xylylene resin material using, for example, a chemical vapor deposition method (CVD). Specifically, in the state in which the stacked body is set in a chamber (not shown), a raw material gas to be the formation material of the protective films 110, 111 is introduced. On this occasion, the raw material gas is introduced into the ejection channels 75 through the slits 125, 126 and the communication holes 150. By the raw material gas introduced into the ejection channels 75 adhering to the inner surfaces of the ejection channels 75, the raw material is deposited on the inner surfaces of the ejection channels 75 as the first protective films 110.

Into the non-ejection channels 76, there is introduced the raw material gas through the non-ejection-side penetrating parts 76*a*. By the raw material gas introduced into the non-ejection channels 76 adhering to the inner surfaces of the non-ejection channels 76, the raw material is deposited as the second protective films 111.

In the nozzle plate bonding step, the nozzle plate 51 and the intermediate plate 52 are bonded to each other so that the nozzle holes 145, 146 are communicated with the inside of the ejection channels 75 through the communication holes 150.

Due to the steps described hereinabove, the head chip 50 is manufactured.

It should be noted that the head chips 50 can be manufactured in terms of wafer. When manufacturing the head chips 50 in terms of wafer, an actuator wafer having a plurality of actuator plates 53 connected to each other, a cover wafer having a plurality of cover plates 54 connected to each other, and an intermediate wafer having a plurality of intermediate plates 52 connected to each other are bonded to one another to form a wafer assembly. Subsequently, the protective films 110, 111 are provided to the wafer assembly, and then, the wafer assembly is cut to thereby form a plurality of head chips 50.

As described above, in the present embodiment, there is adopted the configuration in which the dimension in the X direction in the lower-side opening part 151*a* of the groove part 151 is larger than the dimension in the X direction in the upper-side opening part 152*a* of the penetrating part 152, and the dimension in the X direction in the upper-side opening part 152*a* is no larger than the dimension in the X direction of the ejection channel 75 (the ejection-side penetrating part 75*c*).

According to this configuration, since the dimension in the X direction in the upper-side opening part 152*a* is no larger than the dimension in the X direction of the ejection-side penetrating part 75*c*, it is easy to ensure the bonding area of the intermediate plate 52 to the actuator plate 53. As a result, it is possible to ensure the bonding strength between the intermediate plate 52 and the actuator plate 53 to prevent the detachment of the intermediate plate 52 and the leakage or the like of the ink through an area between the intermediate plate 52 and the actuator plate 53.

Further, even when forming the penetrating parts 152 as post-processing after bonding the intermediate plate 52 and the actuator plate 53 to each other, it is possible to prevent the damage from being inflicted on the actuator plate 53 when processing the penetrating parts 152.

Moreover, since the dimension in the X direction in the lower-side opening part 151*a* is larger than the dimension in the X direction in the upper-side opening part 152*a*, it is easy to performing the alignment between the groove part 151 and the nozzle holes 145, 146 when bonding the intermediate plate 52 and the nozzle plate 51 to each other compared to when making the nozzle holes 145, 146 and the ejection channel 75 directly communicate with each other. In other words, it is possible to allow the displacement between the groove part 151 and the nozzle holes 145, 146 within the dimension in the X direction in the groove part 151. As a result, it is possible to achieve the miniaturization of the ejection channels 75 and the reduction in pitch of the ejection channels 75 while ensuring the positioning accuracy between the nozzle holes 145, 146 and the ejection channels 75.

As a result, it is possible to ensure the tolerance of the displacement between the nozzle holes 145, 146 and the communication hole 150 to achieve the miniaturization of the ejection channels 75 and the reduction in pitch of the ejection channels 75 while ensuring the bonding area between the actuator plate 53 and the intermediate plate 52 to enhance the durability of the head chip 50.

In the present embodiment, there is adopted the configuration in which a dimension from the lower-side opening part 151*a* to the bottom surface of the groove part 151 is larger than a dimension from the bottom surface of the groove part 151 to the upper-side opening part 152*a* in the thickness direction (the Z direction) of the intermediate plate 52.

According to the present embodiment, since the depth of the groove part 151 can be ensured, it is possible to use a space located at the outer side in the X direction with respect to the penetrating part 152 in the groove part 151 as the adhesive containing part 153 when bonding the intermediate plate 52 and the nozzle plate 51 to each other. Therefore, it is possible to prevent the adhesive from inflowing into the penetrating part 152 to thereby prevent the adhesive from affecting the ejection performance.

Since the inkjet head 5 and the printer 1 according to the present embodiment are each provided with the head chip 50 described above, it is possible to provide the liquid jet head high in quality and excellent in reliability.

Figure 15:
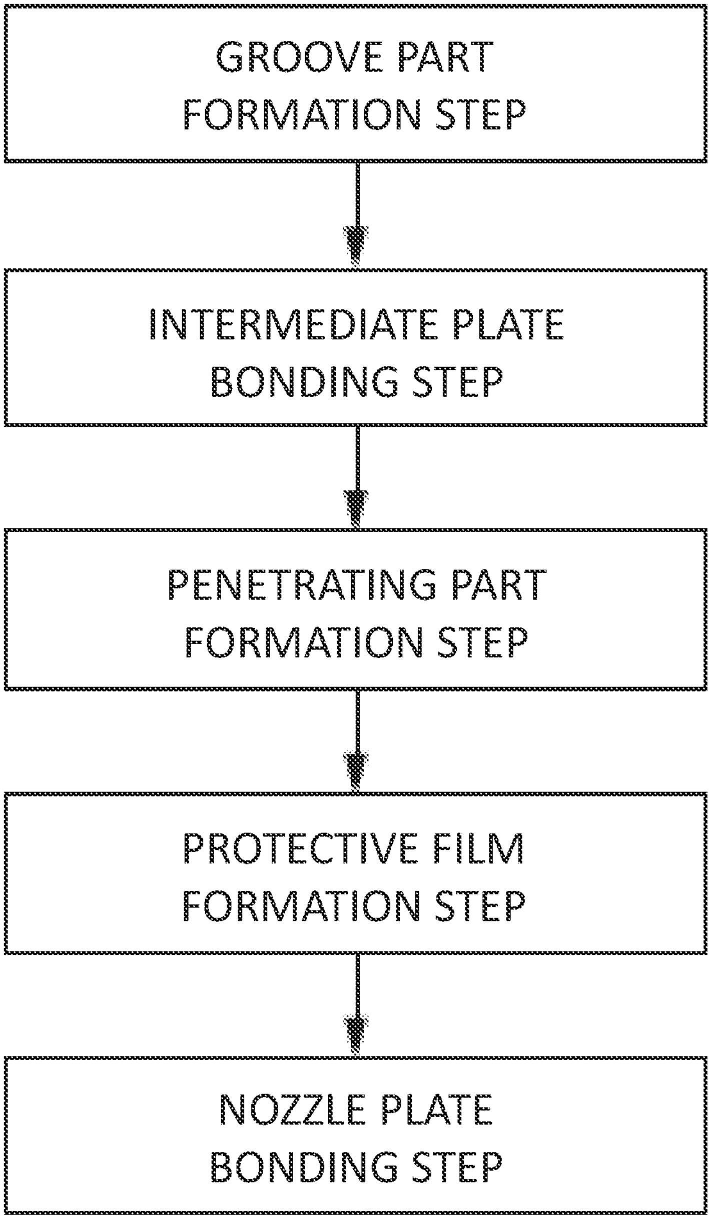
FIG. 15 is a flowchart for explaining a method of manufacturing the head chip according to a modified example of the first embodiment.

In the first embodiment described above, there is described the method including the groove part formation step and the penetrating part formation step as the communication hole formation step after the intermediate plate bonding step, but this configuration is not a limitation. As shown in FIG. 15, in the communication hole formation step, it is sufficient to at least have the penetrating part formation step after the intermediate plate bonding step, and it is possible to perform the groove part formation step before the intermediate plate bonding step. In other words, it is possible to form the groove parts 151 in advance of the bonding of intermediate plate 52, and then bond the intermediate plate 52 provided with the groove parts 151 to the actuator plate 53. By providing the groove parts 151 to the intermediate plate 52 in advance, it is possible to shorten the processing time after stacking the intermediate plate 52 until the head chip 50 is completed.

Second Embodiment

Figure 16:
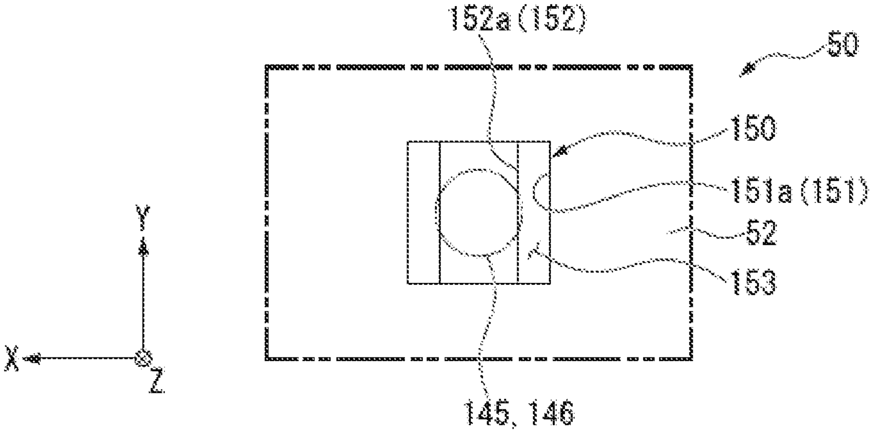
FIG. 16 is a bottom view corresponding to FIG. 9 in a head chip according to a second embodiment.

As shown in FIG. 16, in the head chip 50 according to a second embodiment, the outer shape in the plan view of the communication hole 150 is a square shape. Specifically, in the communication hole 150, the dimensions in the Y direction of the groove part 151 and the penetrating part 152 are equivalent to each other, and are made smaller than the dimension in the Y direction in the ejection-side penetrating part 75*c*, and larger than the maximum inner diameter of the nozzle holes 145, 146. It should be noted that regarding the dimensions in the X direction and the Z direction of the groove part 151 and the penetrating part 152, it is possible to adopt dimensions substantially the same as in the first embodiment.

According to the present embodiment, since the dimension in the Y direction in the penetrating part 152 is shorter than the dimension in the Y direction (the third direction) of the ejection-side penetrating part 75*c*, even when forming the penetrating part 152 as the post processing after bonding the intermediate plate 52 and the actuator plate 53 to each other, it is possible to prevent the damage from being inflicted on the lower surface of the actuator plate 53 when processing the penetrating part 152.

Moreover, by making the dimension in the Y direction (the first direction, the third direction) of each of the groove part 151 and the penetrating part 152 smaller than the dimension in the Y direction in the ejection-side penetrating part 75*c*, it is possible to shorten the processing time of the communication holes 150 in the communication hole formation process. Thus, it is possible to increase the manufacturing efficiency.

Third Embodiment

Figure 17:
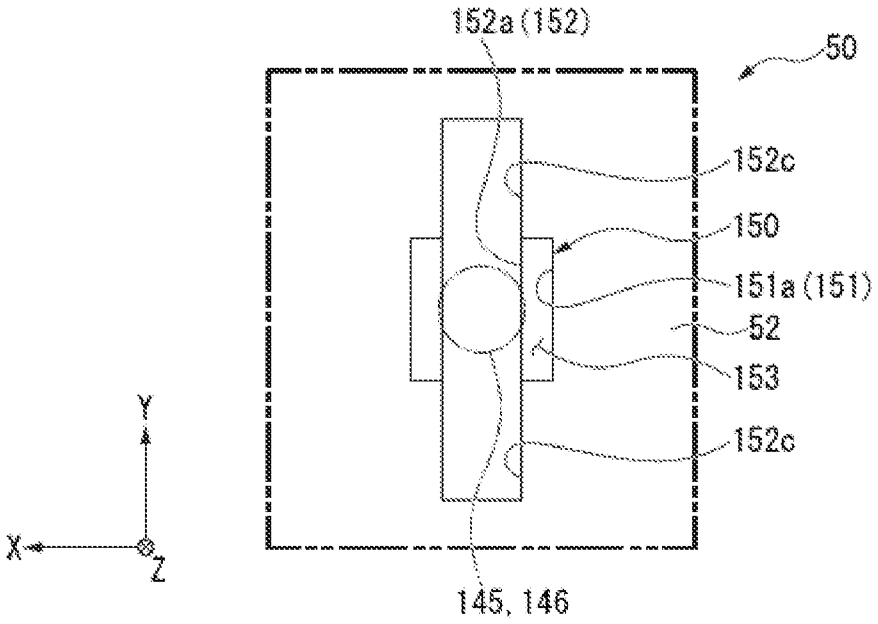
FIG. 17 is a bottom view corresponding to FIG. 9 in a head chip according to a third embodiment.

As shown in FIG. 17, in the head chip 50 according to a third embodiment, the shape in the plan view of the communication hole 150 is an X shape. Specifically, the dimension in the Y direction in the groove part 151 is made smaller than the dimension in the Y direction in the ejection-side penetrating part 75*c*, and larger than the maximum inner diameter of the nozzle holes 145, 146.

The penetrating part 152 penetrates the intermediate plate 52 in the state of straddling an area overlapping the groove part 151 in the plan view in the Y direction in the intermediate plate 52. In other words, the penetrating part 152 penetrates the intermediate plate 52 through the groove part 151 in an area overlapping the groove part 151, and at the same time, penetrates the intermediate plate 52 at the both sides in the Y direction (the first direction) with respect to the groove part 151. A portion protruding in the Y direction with respect to the groove part 151 in the penetrating part 152 constitutes a protruding part 152*c*. In the present embodiment, the dimension in the Y direction in the penetrating part 152 is made equivalent to the dimension in the Y direction in the ejection-side penetrating part 75*c*.

In the present embodiment, since the dimension in the Y direction in the groove part 151 becomes smaller than that of the penetrating part 152, it is possible to shorten the processing time of the groove part 151. As a result, it is possible to increase the manufacturing efficiency.

Moreover, since the dimension in the Y direction in the penetrating part 152 becomes larger than that of the groove part 151, it is possible to make the penetrating part 152 function as an ink flow channel together with the ejection channel 75 when the liquid flows along the Y direction through the ejection channel 75. Thus, it becomes easy to ensure the flow channel cross-sectional area of the ink flow channel, and thus, the pressure loss can be reduced.

Fourth Embodiment

Figure 18:
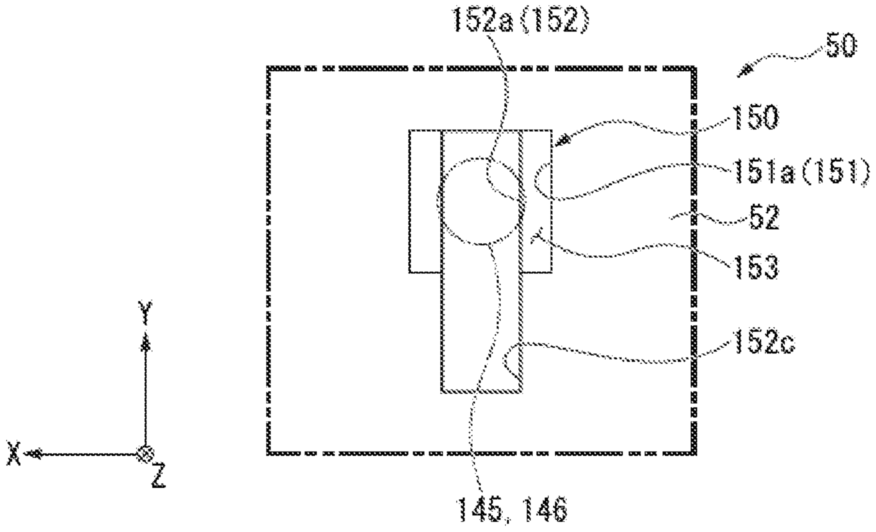
FIG. 18 is a bottom view corresponding to FIG. 9 in a head chip according to a fourth embodiment.

As shown in FIG. 18, in the head chip 50 according to a fourth embodiment, the penetrating part 152 protrudes toward one side in the Y direction (the first direction) with respect to the groove part 151. A portion protruding in the Y direction with respect to the groove part 151 in the penetrating part 152 constitutes a protruding part 152*c*. An orientation in the Y direction of the protruding part 152*c* preferably coincides with a high-pressure side with reference to the nozzle holes 145, 146 in the ejection channel 75.

In the present embodiment, substantially the same functions and advantages as those in the third embodiment described above are exerted, and in addition, the penetrating part 152 (the protruding part 153*c*) is made to protrude in a direction in which the pressure is apt to become high out of the both sides in the Y direction with respect to the groove part 151. Thus, it is possible to shorten the processing time of the penetrating part 152 as much as possible while reducing the pressure loss at one side in the Y direction.

Fifth Embodiment

Figure 19:
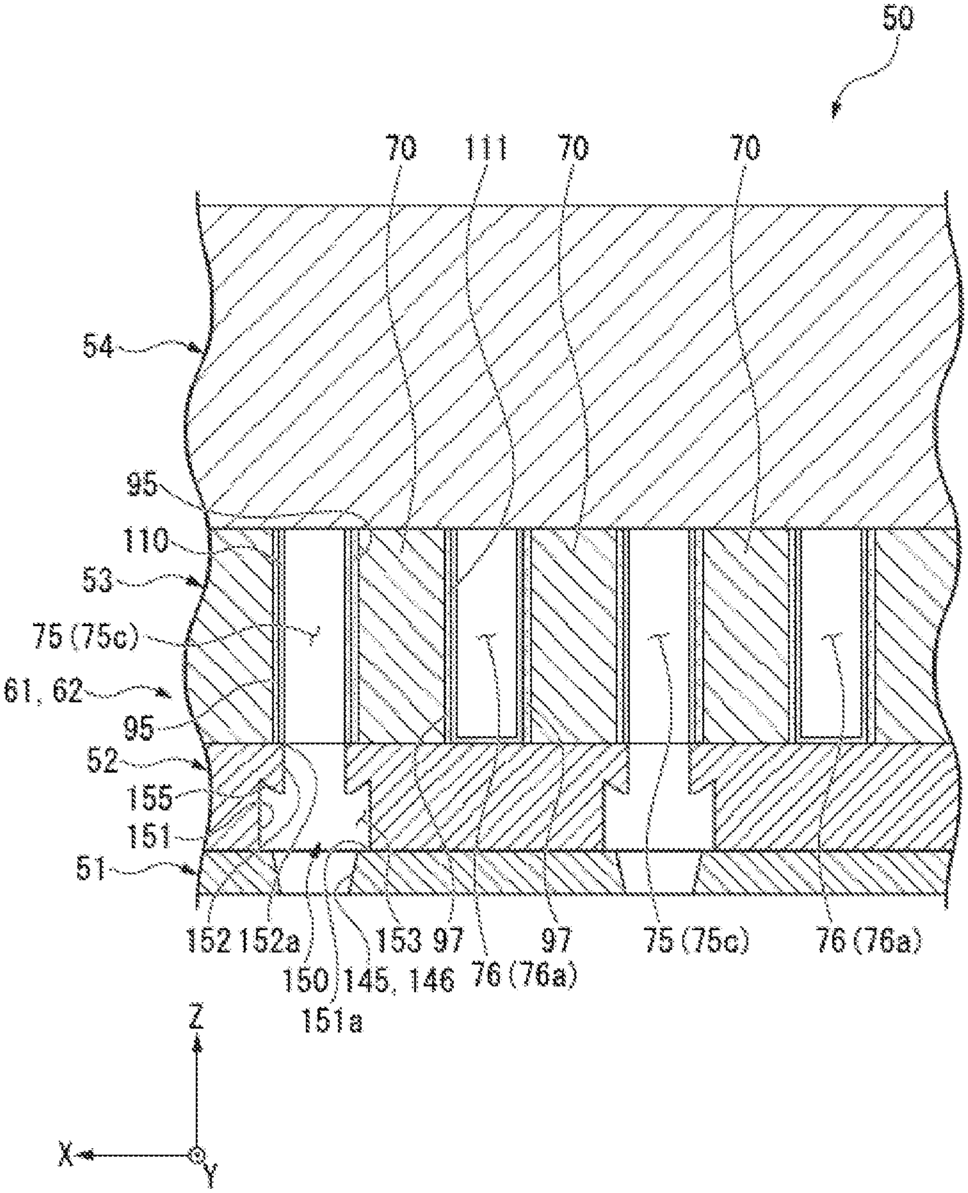
FIG. 19 is a cross-sectional view corresponding to FIG. 8 in a head chip according to a fifth embodiment.

As shown in FIG. 19, in the head chip 50 according to a fifth embodiment, a bulging part 155 is formed on the bottom surface of the groove part 151. The bulging part 155 is formed in a portion (an inner side in the X direction) located closer to the penetrating part 152 in the bottom surface of the groove part 151. The bulging part 155 is formed to have a triangular shape in a cross-sectional view. Specifically, the bulging part 155 gradually increases in bulging amount from the bottom surface of the groove part 151 as proceeding toward an inner side in the X direction. The bulging part 155 functions as a flow stopper for preventing the adhesive contained in the adhesive containing part 153 from flowing into the penetrating part 152. It should be noted that the cross-sectional shape of the bulging part 155 is not limited to the triangular shape, and can arbitrarily be changed to a rectangular shape, a semicircular shape, and so on.

In the present embodiment, when bonding the intermediate plate 52 and the nozzle plate 51 to each other, a space located outside in the X direction of the bulging part 155 in the groove part 151 can be used as the adhesive containing part 153. In this case, since it is possible to restrict the adhesive from inflowing into the penetrating part 152 with the bulging part 155, it is possible to prevent the adhesive from affecting the ejection performance.

Sixth Embodiment

In the embodiments described above, there is described the configuration in which the up-and-down direction of the actuator plate 53 coincides with the thickness direction of the actuator plate 53, and the ejection channels 75 open in the thickness direction of the actuator plate 53 in a central portion (the ejection-side penetrating part 75*c*) in the channel extending direction as the head chip 50 of the side-shooting type, but this configuration is not a limitation.

Figure 20:
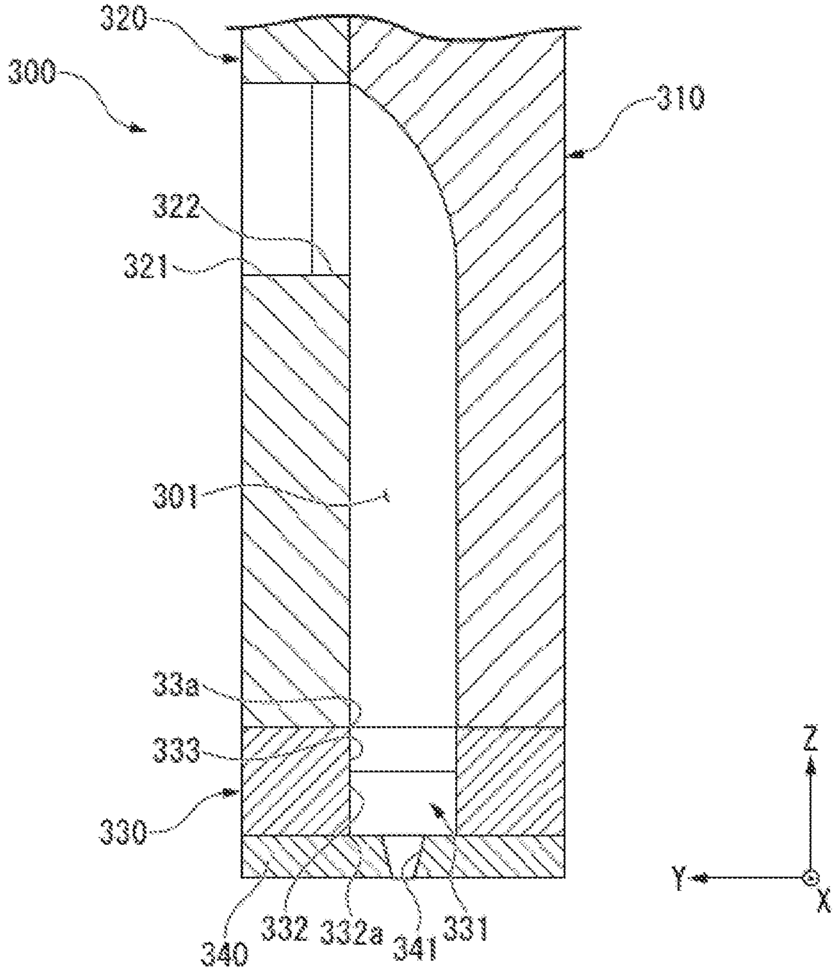
FIG. 20 is a cross-sectional view showing a head chip according to a sixth embodiment.
Figure 21:
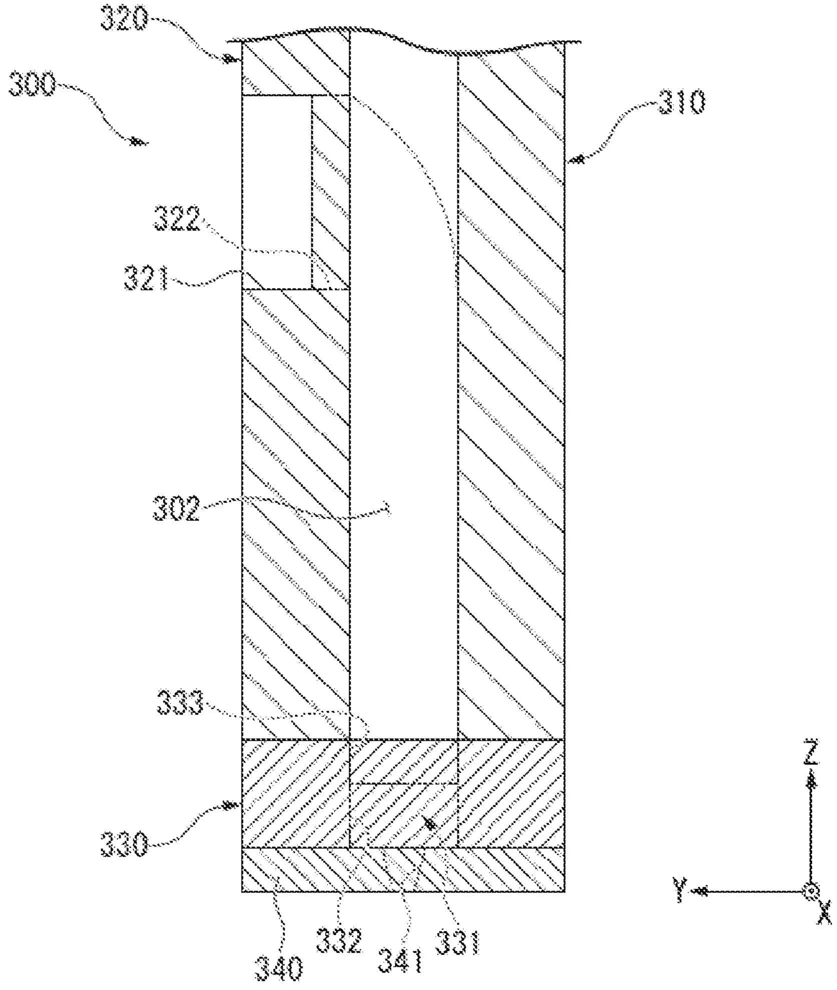
FIG. 21 is a cross-sectional view showing the head chip according to the sixth embodiment.

As shown in FIG. 20 and FIG. 21, a head chip 300 can be a so-called edge-shooting type for ejecting the ink from an end portion in the extending direction in an ejection channel 301. In the following explanation, the description will be presented in some cases defining the +Y side as an obverse surface side, the −Y side as a reverse surface side, the +Z side as an upper side, and the −Z side as a lower side.

In the head chip 300, an actuator plate 310 is provided with the ejection channel 301 and a non-ejection channel 302. The channels 301, 302 are alternately formed in the X direction (the second direction) in the actuator plate 310.

The ejection channel 301 extends in the Z direction (the first direction) in the actuator plate 310. The ejection channel 301 has a channel opening part opening on the lower end surface (the channel opening surface) of the actuator plate 310. The non-ejection channel 302 penetrates the actuator plate 310 in the Z direction.

A cover plate 320 is bonded to the obverse surface of the actuator plate 310 so as to close the obverse-side opening part of each of the channels 301, 302. In the cover plate 320, at a position overlapping the upper end portion of the ejection channel 301 viewed from the Y direction, there is formed a common ink chamber 321. The common ink chamber 321 extends in the X direction with a length sufficient for straddling, for example, the channels 301, 302, and at the same time, opens on the obverse surface of the cover plate 320.

In the common ink chamber 321, at positions overlapping the respective ejection channels 301 viewed from the Y direction, there are formed slits 322. The slits 322 each communicate the upper end portion of corresponding one of the ejection channels 301 and the inside of the common ink chamber 321 with each other. The slits 322 are communicated with the respective ejection channels 301 on the one hand, but are not communicated with the non-ejection channels 302 on the other hand.

The intermediate plate 330 is fixed to the lower end surface of the actuator plate 310 with bonding or the like. In the intermediate plate 330, at positions overlapping the respective ejection channels 301 viewed from the Z direction, there are formed communication holes 331. The communication holes 331 each have a groove part 332 and a penetrating part 333, and penetrate the intermediate plate 330 in the Z direction similarly to, for example, the first embodiment described above. In the groove part 332, a dimension in the X direction in a lower-side opening part 332*a* is made larger than a dimension in the X direction in an upper-side opening part 333*a* in the penetrating part 333. The dimension in the X direction in the upper-side opening part 333*a* in the penetrating part 333 is made no larger than the dimension in the X direction of the channel opening part opening on the lower surface of the actuator plate 310 in the ejection channel 301. It should be noted that the dimension in the Y direction (the third direction) in the penetrating part 333 can be larger or smaller than the dimension in the Y direction of the channel opening part.

The nozzle plate 340 is fixed to a lower end surface of the intermediate plate 330 with bonding or the like. The nozzle plate 340 is provided with nozzle holes 341. The nozzle holes 341 are respectively communicated with the ejection channels 301 through the communication holes 331.

Even when adopting the configuration according to the present disclosure in the head chip 300 of the edge-shooting type as in the present embodiment, substantially the same functions and advantages as in the embodiments described above can be exerted.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction along the horizontal direction.

In the embodiments described above, there is described the configuration in which the ejection channels 75 and the non-ejection channels 76 are arranged in a staggered manner, but this configuration is not a limitation. For example, it is possible to apply the present disclosure to the head chip 50 of a so-called three-cycle type in which the ink is jetted in sequence from all of the channels.

In the embodiments described above, there is described the configuration in which the actuator plate 53, the intermediate plate 52, and the nozzle plate 51 are sequentially bonded to one another, but this configuration is not a limitation. It is possible to dispose another member between the actuator plate 53 and the intermediate plate 52, or between the intermediate plate 52 and the nozzle plate 51. In this case, regarding the jet hole plate stacking step and the intermediate plate stacking step related to the present disclosure, it is not limited to a case where a stacking object is directly bonded to a stacking target object (e.g., the case where the stacking object is the jet hole plate, the stacking target object is the intermediate plate), and as long as the configuration in which the stacking object is stacked on at least the stacking target object, it is possible to bond the stacking object on another member in a state in which the another member is bonded on the stacking target object. Further, even when the stacking object is directly stacked on the stacking target object, the stacking object and the stacking target object can be stacked with a method other than bonding.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

an actuator plate in which a plurality of jet channels extending in a first direction is arranged in a second direction crossing the first direction;

a jet hole plate which has a plurality of jet holes configured to jet liquid, and which is disposed so as to be opposed to a channel opening surface on which the jet channels open in the actuator plate; and an intermediate plate which has communication holes configured to respectively communicate the jet channels and the jet holes with each other, and which is disposed between the actuator plate and the jet hole plate, wherein the communication holes each include a groove part which has a first opening part opening toward the jet hole, and which is recessed toward a direction getting away from the jet hole plate, and a penetrating part which has a second opening part opening toward the jet channel, and which is communicated with the groove part in an area including at least the groove part to thereby penetrate the intermediate plate, a dimension in the second direction in the first opening part is larger than a dimension in the second direction in the second opening part, and a dimension in the second direction in the second opening part is no larger than a dimension in the second direction of a channel opening part opening on the channel opening surface in the jet channel.

2. The head chip according to claim 1, wherein defining a direction crossing the second direction when viewed from a thickness direction of the intermediate plate as a third direction, a dimension in the third direction in the penetrating part is smaller than a dimension in the third direction in the channel opening part.

3. The head chip according to claim 1, wherein
the channel opening surface faces to a thickness direction of the actuator plate, and
the penetrating part protrudes toward both sides in the first direction with respect to the groove part.

4. The head chip according to claim 1, wherein
the channel opening surface faces to a thickness direction of the actuator plate, and
the penetrating part protrudes toward one side in the first direction with respect to the groove part.

5. The head chip according to claim 1, wherein
in a thickness direction of the intermediate plate, a dimension from the first opening part to a bottom surface of the groove part is larger than a dimension from the bottom surface of the groove part to the second opening part.

6. The head chip according to claim 1, wherein
in a portion located closer to the penetrating part in the second direction in the bottom surface of the groove part, a bulging part bulging from the bottom surface is formed.

7. A liquid jet head comprising the head chip according to claim 1.

8. A liquid jet recording device comprising the liquid jet head according to claim 7.

9. A method of manufacturing a head chip including
an actuator plate in which a plurality of jet channels extending in a first direction is arranged in a second direction crossing the first direction,
a jet hole plate which has a plurality of jet holes configured to jet liquid, and which is disposed so as to be opposed to a channel opening surface on which the jet channels open in the actuator plate, and
an intermediate plate which has communication holes configured to respectively communicate the jet channels and the jet holes with each other, and which is disposed between the actuator plate and the jet hole plate, the method comprising:
a communication hole formation step of providing the communication hole to the intermediate plate; and
a jet hole plate stacking step of stacking the jet hole plate on the intermediate plate, wherein
the communication hole formation step includes
a groove part formation step of recessing the intermediate plate toward a direction away from the jet hole plate to provide the intermediate plate with a groove part having a first opening part opening toward the jet hole, and
a penetrating part formation step of penetrating the intermediate plate in an area including at least the groove part to thereby provide the intermediate plate with a penetrating part having a second opening part opening toward the jet channel,
in the groove part formation step, a dimension in the second direction in the first opening part is set larger than a dimension in the second direction in the second opening part,
in the penetrating part formation step, a dimension in the second direction in the second opening part is set no larger than a dimension in the second direction of a channel opening part opening on the channel opening surface in the jet channel, and
in the jet hole plate stacking step, the jet hole plate is stacked on the intermediate plate so that the first opening part and the jet hole are communicated with each other.

10. The method of manufacturing the head chip according to claim 9, further comprising an intermediate plate stacking step of stacking the intermediate plate on the channel opening surface of the actuator plate, wherein
the groove part formation step is performed before the intermediate plate stacking step.

11. The method of manufacturing the head chip according to claim 9, further comprising an intermediate plate stacking step of stacking the intermediate plate on the channel opening surface of the actuator plate, wherein
the groove part formation step and the penetrating part formation step are performed after the intermediate plate stacking step.

* * * * *